US012243199B2

(12) United States Patent
Knuffman

(10) Patent No.: US 12,243,199 B2
(45) Date of Patent: Mar. 4, 2025

(54) METHODS AND SYSTEMS FOR USING TRAINED GENERATIVE ADVERSARIAL NETWORKS TO IMPUTE 3D DATA FOR CONSTRUCTION AND URBAN PLANNING

(71) Applicant: STATE FARM MUTUAL AUTOMOBILE INSURANCE COMPANY, Bloomington, IL (US)

(72) Inventor: Ryan Knuffman, Danvers, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/618,673

(22) Filed: Mar. 27, 2024

(65) Prior Publication Data

US 2024/0242316 A1  Jul. 18, 2024

Related U.S. Application Data

(63) Continuation of application No. 18/091,254, filed on Dec. 29, 2022, now Pat. No. 11,972,541, which is a
(Continued)

(51) Int. Cl.
*G06T 5/77* (2024.01)
*G06N 3/045* (2023.01)
(Continued)

(52) U.S. Cl.
CPC ............... *G06T 5/77* (2024.01); *G06N 3/045* (2023.01); *G06N 3/088* (2013.01); *G06T 7/579* (2017.01);
(Continued)

(58) Field of Classification Search
None
See application file for complete search history.

(56) References Cited

U.S. PATENT DOCUMENTS 10,628,931 B1    4/2020   Ramos et al.
2009/0185741 A1  7/2009   Nahari et al.
(Continued)

OTHER PUBLICATIONS

Niu et al., An Adaptive Face Image Inpainting Algorithm Based on Feature Symmetry, Symmetry, 12(2):190 (2020).
(Continued)

*Primary Examiner* — Frank S Chen
(74) *Attorney, Agent, or Firm* — MARSHALL, GERSTEIN & BORUN LLP

(57) ABSTRACT

A computer-implemented method for using a trained generative adversarial network to improve construction and urban planning includes receiving a semantically-segmented point cloud corresponding to a construction site; determining a volumetric soil measurement; and generating a cost estimate. A computing system for using a trained generative adversarial network to improve vehicle orientation and navigation includes one or more processors, and one or more memories having stored thereon computer-executable instructions that, when executed, cause the computing system to: receive a semantically-segmented point cloud corresponding to a construction site; determine a volumetric soil measurement; and generate a cost estimate. A non-transitory computer-readable medium includes computer-executable instructions that, when executed, cause a computer to: receive a semantically-segmented point cloud corresponding to a construction site; determine a volumetric soil measurement; and generate a cost estimate.

20 Claims, 15 Drawing Sheets

Related U.S. Application Data continuation of application No. 17/982,174, filed on Nov. 7, 2022, now Pat. No. 11,995,805, which is a continuation of application No. 17/031,580, filed on Sep. 24, 2020, now Pat. No. 11,508,042.

(60) Provisional application No. 62/967,315, filed on Jan. 29, 2020.

(51) Int. Cl.
  G06N 3/088 (2023.01)
  G06T 7/579 (2017.01)

(52) U.S. Cl.
  CPC .............. *G06T 2207/10028* (2013.01); *G06T 2207/20081* (2013.01); *G06T 2207/20084* (2013.01)

(56) References Cited

U.S. PATENT DOCUMENTS

| | | |
|---|---|---|
| 2013/0016099 A1 | 1/2013 | Rinard et al. |
| 2014/0285486 A1 | 9/2014 | Chang et al. |
| 2018/0259652 A1* | 9/2018 | Shimizu .............. G01S 7/4972 |
| 2018/0341836 A1 | 11/2018 | Lim et al. |
| 2019/0213790 A1 | 7/2019 | Taguchi et al. |
| 2019/0354742 A1* | 11/2019 | Murakoshi ............ G06V 20/64 |
| 2019/0385064 A1 | 12/2019 | Malaya |
| 2019/0392802 A1 | 12/2019 | Higurashi |
| 2020/0033870 A1 | 1/2020 | Derenick |
| 2020/0077728 A1 | 3/2020 | Gerson et al. |
| 2020/0097818 A1 | 3/2020 | Li et al. |
| 2020/0174492 A1 | 6/2020 | Lee et al. |
| 2020/0402300 A1 | 12/2020 | Ding et al. |
| 2021/0019937 A1 | 1/2021 | Gallaway et al. |
| 2021/0097850 A1 | 4/2021 | Ton-That et al. |
| 2021/0188312 A1 | 6/2021 | Shikari et al. |
| 2021/0209811 A1 | 7/2021 | Ramasubramonian et al. |

OTHER PUBLICATIONS

Structure from Motion (SfM), GSP 216 Introduction to Remote Sensing class, Humbold State University, Humboldt State Geospatial Online, accessed from the Internet at: <<http://gsp.humboldt.edu/OLM/Courses/GSP_216_Online/lesson8-2/SfM.html> (2017).

U.S. Appl. No. 17/031,580, Imputation of 3D Data Using Generative Adversarial Networks, filed Sep. 24, 2020, U.S. Pat. No. 11,508,042, Issued on Nov. 22, 2022.

U.S. Appl. No. 17/982,174, Imputation of 3D Data Using Generative Adversarial Networks, filed Nov. 7, 2022.

U.S. Appl. No. 17/031,580, Imputation of 3D Data Using Generative Adversarial Networks, filed Sep. 24, 2020.

Notice of Allowance for U.S. Appl. No. 18/091,254 dated Dec. 27, 2023.

* cited by examiner

METHODS AND SYSTEMS FOR USING TRAINED GENERATIVE ADVERSARIAL NETWORKS TO IMPUTE 3D DATA FOR CONSTRUCTION AND URBAN PLANNING

CROSS-REFERENCE TO RELATED APPLICATIONS

This application is a continuation of U.S. patent application Ser. No. 18/091,254, entitled "Methods and Systems for Using Trained Generative Adversarial Networks to Impute 3D Data for Construction and Urban Planning," and filed on Dec. 29, 2022, which is a continuation of U.S. patent application Ser. No. 17/982,174, entitled "Imputation of 3D Data Using Generative Adversarial Networks," and filed on Nov. 7, 2022, which is a continuation of U.S. patent application Ser. No. 17/031,580, entitled "Imputation of 3D Data Using Generative Adversarial Networks," and filed on Sep. 24, 2020, which claims priority to U.S. Provisional Application No. 62/967,315, entitled "Imputation of 3D Data Using Generative Adversarial Networks," and filed on Jan. 29, 2020, each of which is incorporated by reference herein in its entirety.

TECHNICAL FIELD

The present disclosure is generally directed to methods and systems for imputation of three-dimensional data using generative adversarial networks, and more particularly, for using a trained generative adversarial network to fill in missing data in a 3D point cloud.

BACKGROUND

Three-dimensional (3D) point clouds may include one or more gaps. The gaps may be caused by a side effect of a photogrammetric technique for generating the 3D point clouds (e.g., structure-from-motion). The gaps may be due to physical limitations of imaging of a scene. For example, imaging a scene may result in multiple unfilled spaces (e.g., black spaces) around/ in structure vertical walls, under trees, etc. Gaps are generally an artifact of overhead, perpendicular imaging, wherein an imaging device (e.g., a drone) cannot "see" around objects in space. Point cloud gaps may be created, alternatively or in addition, intentionally. For example, a user may want to remove all trees from a 3D point cloud.

Interpolation is a relatively simple conventional technique for filling gaps in photographic data. Interpolation works by, for example, averaging pixel values around gaps. However, interpolation ignores contextual information when filling gaps. For example, interpolation may add an eyebrow to a person's face that matches the pixel values surrounding the missing eyebrow (e.g., the pixel values of the face, eye socket, forehead, etc.). However, the filled gap may not appear to be an eyebrow to a human observer, and may be jarring and not useful for practical purposes. Similar problems adhere to interpolation when used to fill gaps in other structures, such as terrain maps.

Inpainting is a known technique for 2D filling gaps in 2D space that takes contextual information into account, and therefore, provides human viewers with more accurate and lifelike gap filling representations. For example, conventional techniques may be able to fill in a facial feature of a person (e.g., a missing eyebrow). However, inpainting in 3D is not a conventional technique. Conventional techniques may include additional drawbacks as well.

BRIEF SUMMARY

The present embodiments may relate to, inter alia, filling gaps in 3D point clouds in a way that appears natural to a human viewer. In one aspect, a non-transitory computer readable storage medium includes instructions that, when executed by one or more processors, cause a computer to: (i) generate a loss value by processing one or more three-dimensional regions and at least one three-dimensional point cloud; (ii) update one or more weights of a generative adversarial network by backpropagating the loss value; and (iii) store the updated weights of the generative adversarial network on a non-transitory computer readable storage medium.

In another aspect, a computer-implemented method for training a generative adversarial network includes (i) generating a loss value by processing one or more three-dimensional regions and at least one three-dimensional point cloud; (ii) updating one or more weights of the generative adversarial network by backpropagating the loss value; and (iii) storing the updated weights of the generative adversarial network on a non-transitory computer readable storage medium.

In yet another aspect, a computing system for training a generative adversarial network includes one or more processors; and a memory storing instructions that, when executed by the one or more processors, cause the system to: (i) generate a loss value by processing one or more three-dimensional regions and at least one three-dimensional point cloud; (ii) update one or more weights of the generative adversarial network by backpropagating the loss value; and (iii) store the updated weights of the generative adversarial network on a non-transitory computer readable storage medium.

BRIEF DESCRIPTION OF THE FIGURES

The Figures described below depict various aspects of the system and methods disclosed therein. It should be understood that each Figure depicts one embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, imputation of three-dimensional (3D) data using Generative Adversarial Networks (GANs), and more particularly, for filling in missing information in 3D point clouds using a trained GAN.

The present techniques may use techniques from the field of photogrammetry and/or structure-from-motion (SFM). Photogrammetry is the science of making measurements from photographs. Structure-from-motion is a photogrammetric range imaging technique for estimating three-dimensional (3D) structures from two-dimensional (2D) objects. The 3D structures estimated in SFM may be used to construct one or more point clouds. A point cloud is a 3D data set comprising individual points that represents a scene (e.g., a courtyard including a church, the interior of a room, a model of a heart, etc.). SFM allows planar images to be converted to a 3D model such as a point cloud. The 3D point cloud may be randomly modified and used to train a GAN to fill in holes in the 3D point cloud, and/or other 3D point clouds that were not used to train the GAN.

The present techniques are useful for filling in information missing from images (i.e., imputing image data), whether the missing information (e.g., a gap) is due to lack of fidelity caused by imperfect perspective/capture and/or information purposefully removed from images (trees or other objects that an analyst seeks to scrub from a final model).

Exemplary Computing Environment

Figure 1:
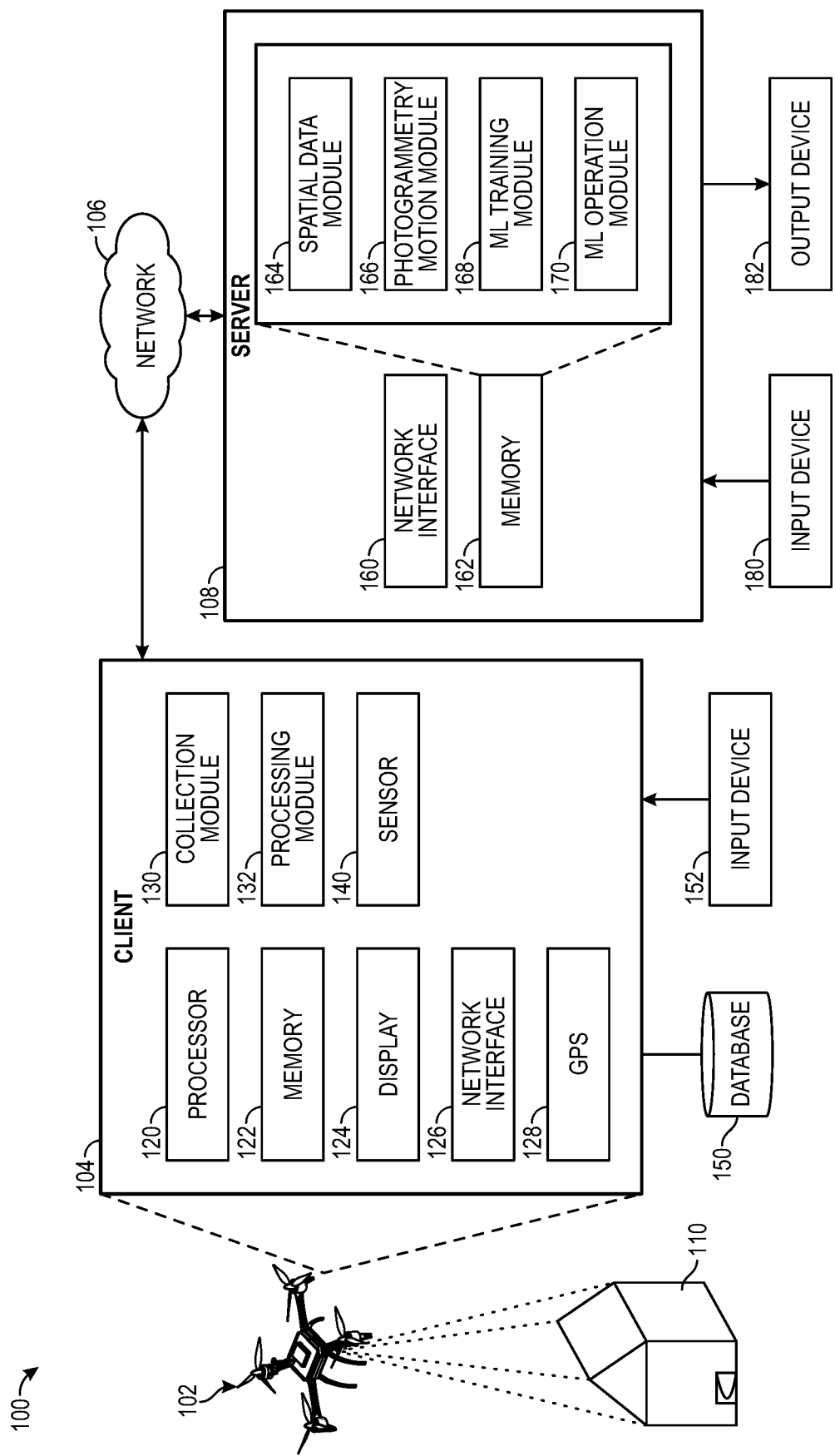
FIG. 1 depicts an exemplary computing environment 100 for implementing the imputation of three-dimensional (3D) data using generative adversarial networks, according to one embodiment.

FIG. 1 depicts an exemplary computing environment 100 for implementing, inter alia, the imputation of three-dimensional (3D) data using generative adversarial networks.

The environment 100 may include an unmanned aerial vehicle (i.e., a drone) 102 in communication with a client computing system 104, a network 106, and a server 108. The drone 102 may capture image data of one or more structure 110, for example. In some embodiments, the structure 110 may be another object, of a different scale/size.

The drone 102 is remote from the server 108 and may be any suitable unmanned aerial vehicle. For example, the drone 102 may include a lightweight (e.g., Magnesium alloy) frame, one or more interchangeable cameras including 5.2K (or higher) video and supporting video codecs (e.g., CinemaDNG, ProRes, etc.). The drone 102 may include a high-speed camera, and other features such as obstacle detection/avoidance. The drone 102 may include landing gear. The one or more cameras of the drone 102 may be rotatable. The drone 102 may be programmable and/or operator controlled, and may include a first person video pilot camera.

The drone 102 may be purchased as a commercial-off-the-shelf (COTS) product or custom built. In some embodiments, the present techniques may be utilized by an entity (e.g., a government/military) using proprietary drone 102 hardware that is not available for purchase by the general public. The drone 102 may capture 2D and/or 3D video data to a local storage device and/or stream the video data to another component of the environment 100, such as the server 108, via the network 106. While FIG. 1 depicts only a single drone 102, the drone 102 may be in communication with numerous other drones similar to the drone 102 (and/or a command drone) via the network 106 and/or other networks. For instance, the drone 102 may be part of a drone swarm or a swarm of drones.

The network 106 may include any suitable combination of wired and/or wireless communication networks, such as one or more local area networks (LANs), metropolitan area networks (MANs), and/or wide area network (WANs). As just one specific example, the network 106 may include a cellular network, the Internet, and a server-side LAN. As another example, the network 106 may support a cellular (e.g., 4G, 5G, etc.) connection to a mobile computing device of a user and an IEEE 802.11 connection to the mobile computing device. While referred to herein as a "server," the server 108 may, in some implementations, include multiple servers and/or other computing devices. Moreover, the server 108 may include multiple servers and/or other computing devices distributed over a large geographic area (e.g., including devices at one or more data centers), and any of the operations, computations, etc., described below may be performed in by remote computing devices in a distributed manner.

The client 104 may include hardware and software components implemented in one or more devices permanently and/or temporarily affixed to, or otherwise carried on or within, the drone 102. For example, some or all of the components of the 104 may be built into the drone 102 or affixed elsewhere within/on the drone 102 (e.g., via a USB or other data port of the drone 102). In one embodiment, a portion of the client 104 may be implemented using a mobile computing device (e.g., a smart phone of the user). The client 104 may include specialized hardware (e.g., one or more sensors) and computer-executable instructions for retrieving and/or receiving drone video data from the drone 102. In some cases, the client 104 may be implemented using components of the drone 102 and a mobile computing device. The client 104 may include a processor 120, a memory 122, a display 124, a network interface 126, and a global positioning system (GPS) unit 128. The processor 120 may be a single processor (e.g., a central processing unit (CPU)), or may include a set of processors (e.g., a CPU and a graphics processing unit (GPU)).

The memory 122 may be a computer-readable, non-transitory storage unit or device, or collection of units/devices, that includes persistent (e.g., hard disk) and/or non-persistent memory components. The memory 122 may store instructions that are executable on the processor 120 to perform various operations, including the instructions of various software applications and data generated and/or used by such applications. In the exemplary implementation of FIG. 1, the memory 122 stores at least a collection module 130 and a processing module 132. Generally, the collection module 130 is executed by the processor 120 to facilitate collection of video data from the drone 102 and the processing module 132 is executed by the processor 120 to facilitate the bidirectional transmission of drone data (e.g., a still image, image metadata such as IMU, etc.) between the client 104 and the server 108 (e.g., sending drone data collected from the drone 102 to the server 108, receiving instructions related to the collection of data from the server 108, receiving/retrieving drone data, etc.).

The display 124 includes hardware, firmware and/or software configured to enable a user to interact with (i.e., both provide inputs to and perceive outputs of) the client 104. For example, the display 124 may include a touchscreen with both display and manual input capabilities. In some embodiments, the client system 104 may include multiple different implementations of the display 124 (e.g., a first display 124 associated with the drone 102 and a second display 124 associated with a mobile computing device of the user).

The network interface 126 may include hardware, firmware and/or software configured to enable the drone 102 and/or client 104 to wirelessly exchange electronic data with the server 108 via the network 106. For example, network interface 126 may include a cellular communication transceiver, a WiFi transceiver, and/or transceivers for one or more other wireless communication technologies (e.g., 4G and/or 5G).

The GPS unit 128 may include hardware, firmware and/or software configured to enable the client 104 to self-locate using GPS technology (alone, or in combination with the services of server 108 and/or another server not shown in FIG. 1). Alternatively, or in addition, the client 104 may include a unit configured to self-locate, or configured to cooperate with a remote server or other device(s) to self-locate, using other, non-GPS technologies (e.g., IP-based geolocation).

In some embodiments, the collection module 130 (or other software stored in the memory 122) provides functionality for collecting drone data from the drone 102. Drone data may include one or more images captured from a capture device, GPS location data, or other metadata (e.g., IMU). The collection module 130 may include instructions for accessing a bus or API of the drone 102 to retrieve/receive the drone data. The collection module 130 may receive/retrieve the drone data in real time as the data is generated by the drone 102, in batches (e.g., periodically every N minutes or more frequently, wherein N is a positive integer) and/or at the end of a drone 102 flight session. When the collection module 130 is integral to the drone 102, the collection module 130 may access the drone data via a wired connection. When the collection module is not integral to the drone but is integral to another component (e.g., a mobile device of the user), the collection module 130 may access the drone data via a wireless connection (e.g., WiFi internet, Bluetooth, etc.).

Using the drone 102 advantageously allows the operator of the present techniques to fly ore frequently/and cost-effectively than manned aircraft/satellite imaging. For example, the imaging can be updated daily/weekly or, in some cases, more frequently. Moreover, data may be processed as it is captured by the drone, decreasing overall latency of the environment 100. The processing module 132 provides functionality for processing drone data from the drone 102. The processing module 132 may retrieve/receive data from the collection module 132 and may transmit data to/from the database 136. The processing module 132 may transmit data to/from the server 108. The collection module 130 may collect data from one or more sensors and may store collected data in the database 150.

The drone 104 may further include a sensor 140, an electronic database 150, and an input/output device 152. The sensor 140 may include one or more sensors associated with the drone 102 (e.g., an airspeed sensor) and/or a mobile device of the user (e.g., an accelerometer). The sensor 140 may provide data (e.g., sensor readings) to applications (e.g., the collection module 130). Many types of sensors may be used, such as cameras, video cameras, and/or microphones. In some embodiments, sensors may read particular drone data.

The database 150 may be any suitable database (e.g., a structured query language (SQL) database, a flat file database, a key/value data store, etc.). The database 150 may include a plurality of database tables for storing data according to data storage schema. The database 150 may include relational linkages between tables, and may allow complex data types such as image blob data to be stored and queried.

The I/O device 152 may include hardware, firmware and/or software configured to enable a user to interact with (i.e., both provide inputs to and perceive outputs of) the client 104. For example, the display 124 may include a touchscreen with both display and manual input capabilities. In some embodiments, the I/O device 152 includes a keyboard, one or more speakers, a microphone, etc. Via the I/O device 152, the user may configure instructions that cause the client 104 to transmit drone data to the server 108 via the network 106.

In some embodiments, the I/O device 152 and/or another module may include instructions for sending/receiving remote control instructions from a user. For example, the user may use the drone 102 remote controller (not depicted) that is coupled to the drone wirelessly to navigate/pilot the drone 102, and/or to view live aerial video of the drone 102.

The server 108 may include a network interface 158, a processor 160, and a memory 162. The server 108 may include one or more transceivers configured for wireless communication over one or more radio frequency links.

The network interface 158 may include hardware, firmware and/or software configured to enable the server 108 to exchange electronic data with the telematics system 104 via network 106. For example, network interface 158 may include a wired or wireless router and a modem. The processor 160 may be a single processor (e.g., a central processing unit (CPU)), or may include a set of processors (e.g., a CPU and a graphics processing unit (GPU)).

The memory 162 is a computer-readable, non-transitory storage unit or device, or collection of such units/devices, that may include persistent (e.g., hard disk) and/or non-persistent memory components. The memory may store one or more modules comprising sets of computer-executable instructions, such as a spatial data module 164, a photogrammetry motion module 166, a machine learning training module 168, and a machine learning operation module 170. The memory 162 may store data generated and/or used by the modules.

The spatial data module 164 may receive/retrieve data from the processing module 132 of the client 104. Specifically, the spatial data module 164 may receive/retrieve drone data (e.g., 2D images, 3D images, and image/drone metadata). The spatial data module 164 may store the received/retrieved data/metadata in the memory 162 and/or in another location (e.g., in an electronic database). The spatial data module 164 may include instructions for associating video data with other data (e.g., metadata). For example, the spatial data module 164 may associate one or more image with a respective GPS location and/or IMU information received from the client 104. The spatial data module 164 may provide data to the photogrammetry motion module 166.

The photogrammetry motion module 166 may include instructions for generating 3D point clouds from 2D image data. The photogrammetry motion module 166 may be used to generate a 3D model using 2D drone data captured by an image capture device of the drone 102. Once the drone 102 has captured several images corresponding to a scene, the photogrammetry motion module 166 may generate a 3D point cloud corresponding to the scene by analyzing the 2D drone data. The 3D point cloud may be stored in an electronic database, wherein the 3D point cloud is usable by other modules (e.g., the ML training module 168) for various purposes.

The ML training module 168 may be generally configured to load, create, train, and/or store ML models for use by the server 108 and/or the client 104. For example, the ML training module 168 may include instructions for training a generative adversarial network ML model by analyzing ground truth data and sample generative data, as further described below. Specifically, the ML training module 168 may train a GAN to probabilistically fill holes in a 3D scene, such as those gaps caused by the inherent physical limitations of overhead imaging. The ML training module 168 may use the 3D point clouds generated by the photogrammetry motion module 166 as training data. In some embodiments, the ML training module 168 may subdivide a single 3D point cloud into many training examples, wherein each training example includes randomly generated holes.

For example, the ML training module 168 may retrieve/receive a 3D point cloud corresponding to a physical scene. The ML training module 168 may use as ground truth data the unaltered 3D point cloud. The ML training module 168 may use as the random sample data a modified copy of the 3D point cloud, wherein the modified copy of the 3D point cloud includes 3D holes added to the modified copy of the 3D point cloud at random locations. The ML training module 168 may randomly simulate holes that are in a variety of shapes (e.g., arbitrarily-shaped holes, geometrically-shaped holes, etc.). For example, the holes may be of different sizes and shapes (e.g., spherical shapes, cylindrical shapes, cubic shapes, rectilinear shapes, polygonal shapes, irregular shapes, etc.).

The ML training module 168 may train only on the removed portions. For example, in the "Swiss cheese" of the modified 3D point cloud, the points corresponding to the randomly-generated holes may be removed and retained as the ground truth points. The GAN may be trained using only those points as target points, rather than using the entire 3D image, in some embodiments. The process of removing portions from the 3D point clouds may be known as extraction. Any 3D region may be removed (e.g., a 3D polygonal region, a 3D square region, etc.).

In general, the ML training module 168 may train models by, inter alia, establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures.

Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned," values.

In one embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

In another embodiment, the trained ML model may include an artificial neural network (ANN) having an input layer, one or more hidden layers, and an output layer. Each of the layers in the ANN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of ANNs are possible.

The input layer may correspond to a large number of input parameters (e.g., one million inputs), in some embodiments, and may be analyzed serially or in parallel. Further, various neurons and/or neuron connections within the ANN may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction or an expected value.

In some embodiments and/or scenarios, the output layer includes only a single output. For example, a neuron may correspond to one of the neurons in the hidden layers. Each of the inputs to the neuron may be weighted according to a set of weights W1 through Wi, determined during the training process (for example, if the neural network is a recurrent neural network) and then applied to a node that performs an operation α. The operation α may include computing a sum, a difference, a multiple, or a different operation. In some embodiments weights are not determined for some inputs. Neurons of weight below a threshold value may be discarded/ignored. The sum of the weighted inputs, r1, may be input to a function which may represent any suitable functional operation on r1. The output of the function may be provided to a number of neurons of a subsequent layer or as an output of the ANN.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs. For example, a GAN trained using terrain for a portion of a large 3D scene may be able to generalize about unseen portions of the terrain.

The ML operation module 170 may load a model (e.g., a GAN) trained by the ML training module 168 from the memory 162 or another location. For example, the ML operation module 170 may load a trained ML model and pass a series of parameters (e.g., a 3D point cloud of a scene including holes, whether the holes are imaging artifacts or created by an administrator). The ML operation module 170 may receive from the trained GAN a copy of the 3D point cloud wherein the holes are all probabilistically filled using the generator portion of the GAN. The generated 3D point cloud with filled holes may be stored in the memory of the server 162 or in another location (e.g., in an electronic database of the server 108).

The server 180 may further include an input device 180 and an output device 182. The input device 180 may include hardware, firmware and/or software configured to enable a user to interact with (i.e., provide inputs to) the server 108. The output device 182 includes hardware, firmware and/or software configured to enable a user to interact with (i.e., provide inputs to) the server 108. By using the input device 180 and the output device 182, the user may configure the modules of the server 108, inspect data stored in the memory 162 of the server 180, and perform other operations.

In operation, a user may cause the drone 102 to overfly a scene. The drone 102 may follow a pre-determined flight path programmed into the memory 122 of the drone 102 and/or may be piloted remotely by the user. For example, the user may override the pre-programmed drone 102 flight path. The collection module 130 of the drone 102 may capture images of the scene according to a pre-determined logic/time interval, and/or at the initiation of the user (e.g., via the remote control). The collection module 130 may capture 2D images. The processing module 132 may transmit the captured 2D images and/or additional data respective to each image (e.g., GPS coordinates, metadata, etc.) immediately or after a delay to the server 108 via the network 106.

The spatial data module 164 may receive the images and/or data. The spatial data module 164 may associate the images and/or data by, for example, adding a sequential identifier to each image. The spatial data module 164 may store the images in an electronic database such that the sequential orientation is preserved. In some embodiments, the spatial data module 164 may analyze the 2D images and reject/discard those for which no metadata is available, or those which are corrupted/blank or blurred.

Once the spatial data module 164 has stored the images, the photogrammetry motion module 166 may analyze the images to generate a 3D point cloud. The photogrammetry motion module 166 may utilize structure-from-motion techniques to plot points in the 3D point cloud from overlapping points within multiple of the 2D images stored by the spatial data module 164. The photogrammetry motion module 164 may store the generated 3D point cloud in the electronic database, optionally in association with the plurality of 2D images used to generate the 3D point cloud. A user may rotate the generated 3D point cloud and view the point cloud in 3D space. Each point in the point cloud may include a 3D coordinate value (e.g., X, Y, Z) and an R, G, B color value taken from the images used to create the tie points.

Once the 3D point cloud is generated, the ML operation module 170 may analyze the 3D point cloud using an ML model trained by the ML training module 168 to fill in the holes of the 3D point cloud. GAN model training is described further below. In general, the ML training module 168 may use 3D point cloud training data that includes holes due to artifacts of an imaging process, and/or holes that are added into the 3D point cloud by a generator. The output of the ML operation module 170 may be a copy of the 3D point cloud generated by the photogrammetry motion module 166, wherein any holes are filled by the GAN.

Exemplary Scene Capture

Figure 2A:
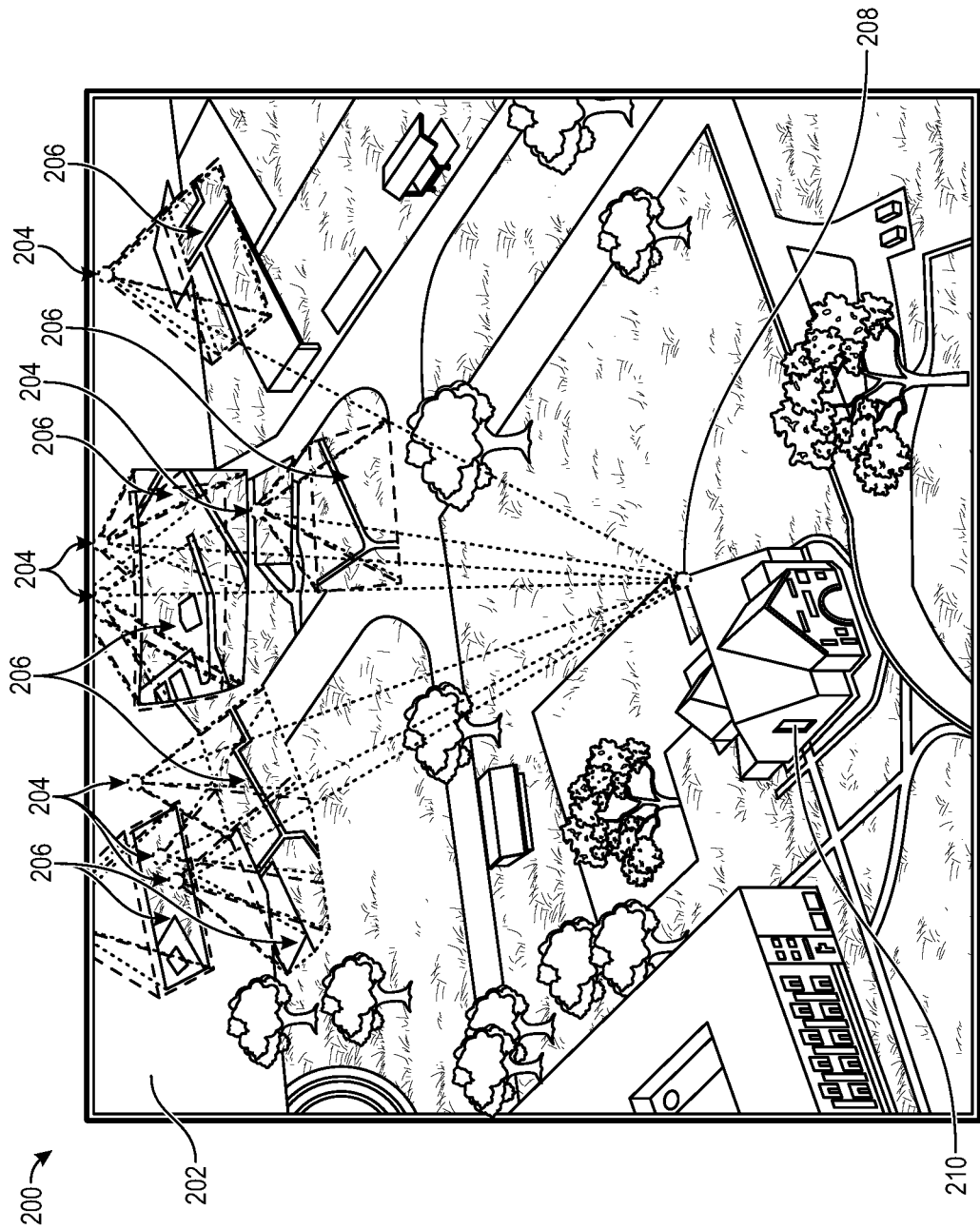
FIG. 2A depicts an exemplary environment including a 3D scene constructed by performing structure-from-motion techniques, according to one embodiment.

FIG. 2A depicts an exemplary environment 200 including a 3D scene 202 constructed by performing structure-from-motion techniques. The scene 202 may include one or more of capture locations 204 and one or more respective planar images 206, wherein each of the respective planar images 206 corresponds to one of the capture locations 204. Each of the capture locations 204 may correspond to a tie point 208. Each of the capture locations 204 may correspond to a capture device of a flight device (e.g., a camera of a drone, such as the drone 102). The tie point 208 is a single recognizable feature of a structure 210 that each of the flight devices at each of the capture locations 204 have a vantage of. For example, the tie point 208 may correspond to a single feature of the structure 110 or the structure 210, such as a church steeple.

It should be appreciated that the tie point may correspond to any pixel or collection of pixels that the planar images 206 commonly include. In one embodiment, a capture device at a location 204 may not have a clear view of the tie point 208. In that case, the photogrammetry motion module 166 may analyze the planar image 206 and discard the planar image 206 generated by the capture device. Each respective capture location 204 may include a line connecting the capture location 204 to the tie point 208 and additional lines of sight connecting the capture location 204 to the edges of a planar image 206. The lines of sight of each capture location 204 depicting a visualization of where the capture device was located when it captured the planar image 206 corresponding to the structure 210. The photogrammetry motion module 166 may analyzes the planar images 206 to generate a point cloud. Lines of sight are further discussed with respect to FIG. 4, below.

In the example of FIG. 2A, the steeple of the structure 210 is the tie point 208. The photogrammetry motion module 166 may include instructions for determining as many tie points 208 (e.g., trees, people, buildings, etc.) as possible from multiple images. For example, a point A and a point B may be visible in a first planar image 206 and a second planar image 206, but appear in the respective planar images 206 to be of different perspective, due to differing locations of the respective capture devices used to capture the planar images 206. The photogrammetry motion module may include instructions for extrapolate the connections between the point A and the point B and other points many times (e.g., hundreds of thousands/millions) to construct a collection of points observed from multiple perspectives. The photogrammetry motion module 166 may determine the source of change relative to one another of the points A and B, and save the source of change as the 3D space the points lie in. Once enough images are captured, the photogrammetry motion module 166 may find multiple tie points 208, allowing triangulation of pixels per image in a 3D space/environment from 2D images (i.e., a 3D point cloud).

The photogrammetry motion module 166 may include instructions for tagging the 3D point cloud with additional image data for increasing density of the 3D point cloud. The photogrammetry motion module 166 may tag each 3D point in the 3D point cloud with geospatial metadata (X,Y,Z) and one or more scalar values (e.g., color or other metadata). For example, enhanced GPS (e.g., 2.5 cm accuracy) data may be collected by the drone and added to the 3D point cloud. Data from the drone 102 inertial measurement unit (IMU) may also be collected. The present techniques advantageously allow analysts to attain 3D spatial awareness (e.g., elevation) by building a 3D scene including x, y, z and color values at each respective coordinate from 2D images.

As described above, gaps are an unavoidable aspect of imaging. The gaps in the scene 202 appear as dark regions beneath trees and on the vertical surfaces of buildings. These are natural spots for holes to occur when a perpendicular camera capture angle is used, as the camera cannot see through solid objects. However, in some embodiments, another imaging type (e.g., LIDAR, infrared, near-infrared, thermal, etc.) may be combined with the photographic imaging of the drone 102 to provide a more complete model, with fewer gaps. Such additional/alternate imaging modalities may provide other information as well, such as vegetation health, fuel loads for wildfire analysis, dry brush, etc.

Figure 2B:
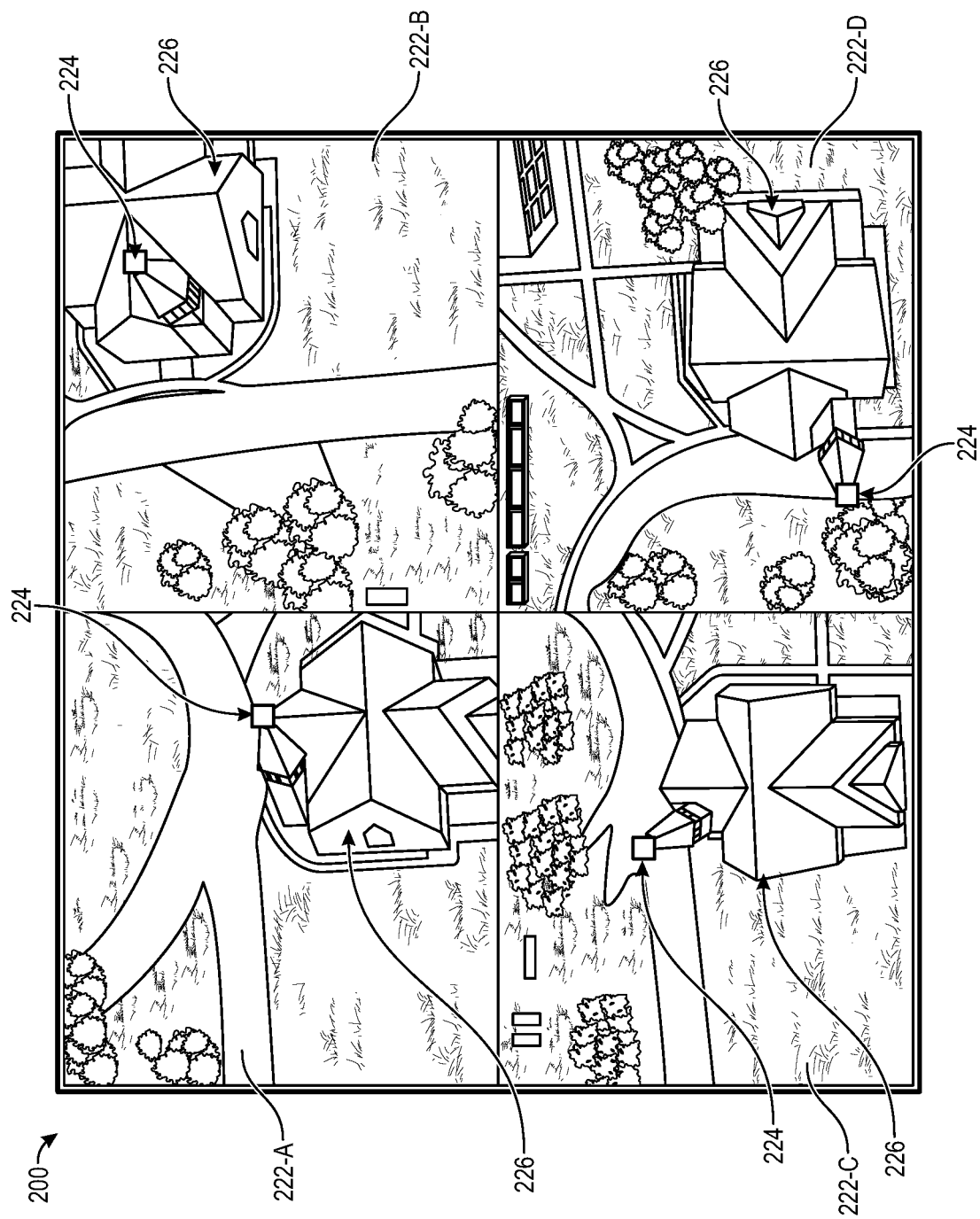
FIG. 2B depicts an exemplary environment including a plurality of scenes corresponding to the scene of FIG. 2A, according to one embodiment.

FIG. 2B depicts an exemplary environment 200 including scenes 222-A-222-D, wherein each of the scenes 222-A through 222-D may correspond to the scene 202. For example, the scenes 222-A through 222-D include a respective tie point 224 that corresponds to the tie point 208, and a respective structure 226 that corresponds to the structure 210 of FIG. 2A and the structure 110 of FIG. 1, for example.

The capture device (e.g., the drone 110 of FIG. 1) may include instructions for capturing (or may be controlled/programmed to capture) images of the scene 202 from a perspective that is perpendicular to the ground (i.e., straight down), as depicted in FIG. 2B. The capture device may include overlap between the scenes 222-A through 222-D, such that one or more points (i.e., tie points) are captured in multiple images.

Exemplary Generative Adversarial Network

Figure 3:
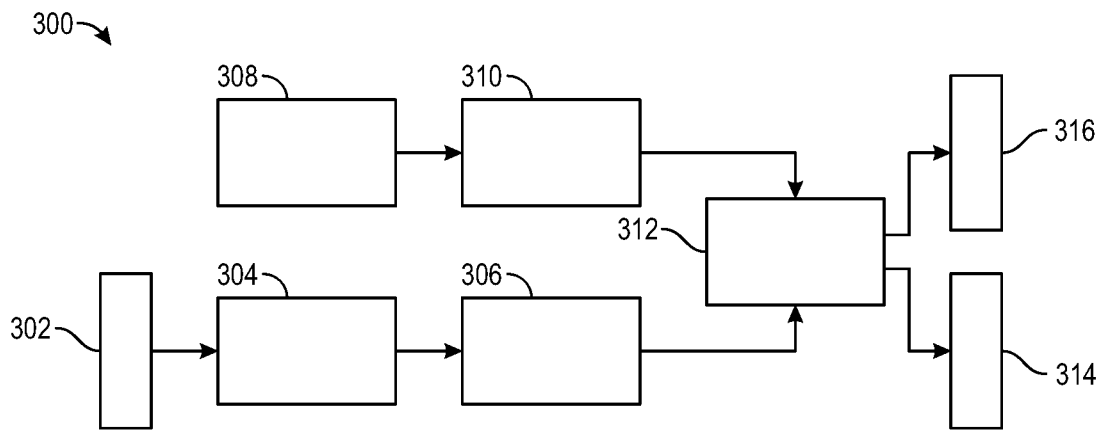
FIG. 3 depicts an exemplary generative adversarial network, according to one embodiment.

FIG. 3 depicts an exemplary GAN 300. The GAN 300 includes a test input 302 and a generator 304. The generator 304 may be an artificial neural network (ANN) that generates a generative sample 306. Generating the generative sample 306 may include the generator 304 modifying a ground truth image by, for example, creating a geometric hole in the ground truth image. The GAN 300 may create a hole randomly, in terms of size/area, position and/or geometry of the hole. The GAN 300 further may include ground truth images 308 and a ground truth sample 310.

The GAN 300 further may include a discriminator 312. The discriminator 312 may be an ANN that accepts as input the generative sample 306 and the ground truth sample 310. As the GAN 300 is operated, the discriminator 312 compares the generative sample 306 and the ground truth sample 310 to generate a generator loss 314 and a discriminator loss 316. The generator loss 314 and/or discriminator loss 316 may be implemented using a loss function such as minimax. The GAN 300 may be trained to discriminate among RGB-colorspace features of images, and/or in other dimensions (e.g., with respect to a property of an image, such as elevation).

The GAN 300 may use a generator/discriminator pattern, wherein two neural networks (one generator and one discriminator) are concurrently trained to produce an image. The generator 304 generates an image that the discriminator 312 analyzes. The discriminator 312 attempts to determine whether the image generated by the generator 304 corresponds to a real image or a fabricated (i.e., counterfeit or fake) image. The generator 304 and discriminator 312 may comprise a feedback loop. In some embodiments, the generator 304 includes a convolutional neural network (CNN).

The ground truth used for training the GAN 300 may include—drone images and training images having simulated gaps. No labeling may be performed to train the GAN, and training may be fully automated. For example, the training module 168 may include randomly simulating holes in a point map corresponding to an area (e.g., a 70-acre section of land). The holes may be random in terms of shape and size, and may be uniform and/or non-uniform. Once the gaps or holes are added, the machine learning module 168 may use those portions of the point map that were removed from the holes/gaps as training data for the GAN 500. Advantageously, by using shapes of different shape/size, the GAN learns to fill in gaps of any shape (e.g., an organic, non-symmetrical shape such as shadows cast beneath tree). By doing so, the GAN is able to be used to analyze point maps having any arbitrary holes/gaps, including those 3D point maps that were not used to train the GAN.

The discriminator 312 may classify one or more inputs (e.g., a 3D point cloud or a portion thereof) into a category of real or fabricated. The discriminator 312 may be trained using real images, such as images of terrain. The discriminator may be trained using fabricated images, such as images of terrain wherein some portion of the image has been deleted or removed. Fabricated images produced by the generator ANN 304 may be used to train the discriminator 312.

The discriminator 312 may use backpropagation to update a set of discriminator weights. For example, an operator (e.g., the ML training module 168 of FIG. 1) may provide a real image to the discriminator 312. The discriminator 312 may classify the real image as fabricated. When the discriminator 312 incorrectly classifies an image (e.g., classifies a real image as fabricated, or a fabricated image as real), the ML training module 168 may update the discriminator loss 316 using backpropagation. When the classification of the discriminator 312 is correct, the weights may remain unchanged.

The generator 304 may be trained (e.g., by the ML training module 168) to generate image samples (e.g., the generative sample 306). The discriminator analyzes the generative sample 306 and produces a real/fabricated output, indicating whether the discriminator finds the generative sample 306 as corresponding to a real or fabricated item. The discriminator classification includes the discriminator loss 316. The discriminator loss 316 is backpropagated through the GAN 300, and the weights of the ANN of the generator 304 are repeatedly updated, improving the ability of the generator to produce samples that appear real to the discriminator.

The generator 304 and the discriminator 312 may not be trained simultaneously. For example, in some embodiments, the generator 304 may be trained for n epochs, followed by the discriminator 312 being trained for m epochs, wherein n and m are any positive integers. The training of n and m epochs may be repeated until the GAN 300 makes stable predictions as to the authenticity of each input.

In some embodiments, the GAN 300 may be used for semantic inpainting tasks, wherein portions of an image are missing (e.g., either removed from or absent from the image). The GAN 300 may fill in the information missing from the image in a way that causes the resulting filled in image to appear natural to a human viewer.

Exemplary Photogrammetry Environment

Figure 4:
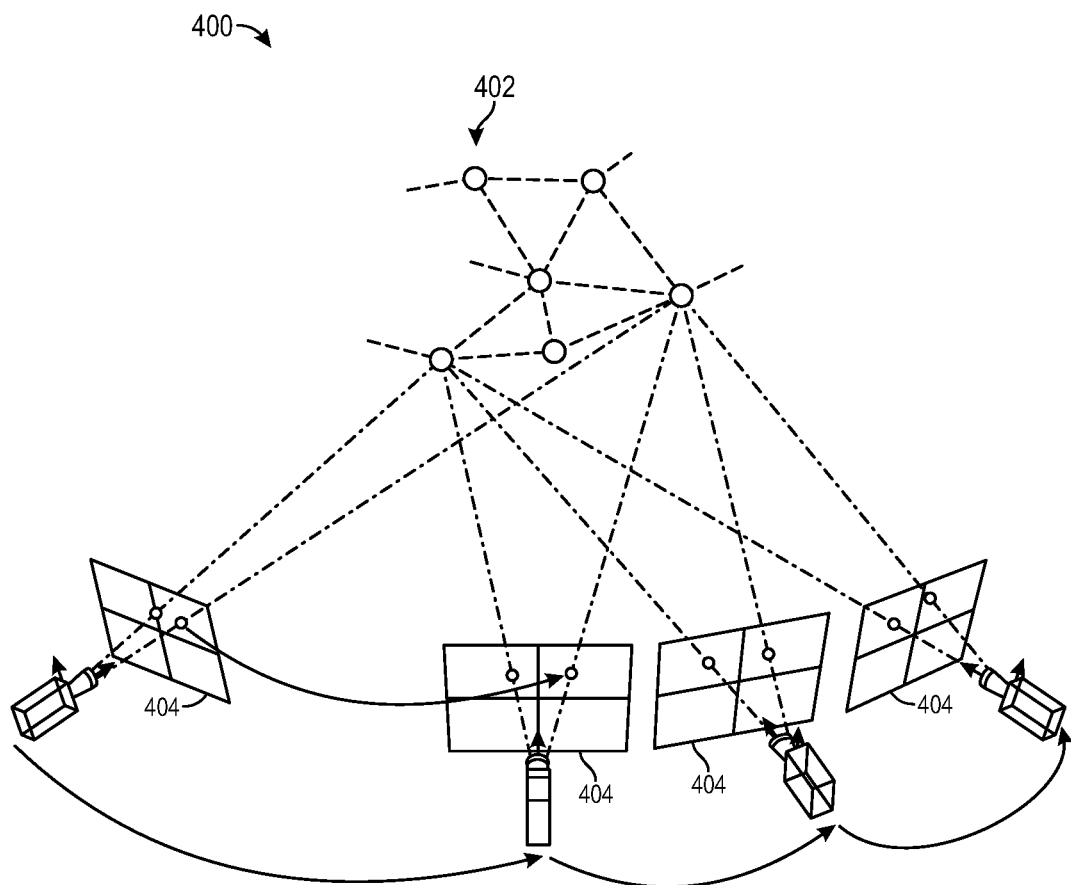
FIG. 4 depicts an exemplary photogrammetry environment, according to one embodiment.

FIG. 4 depicts an exemplary photogrammetry environment 400. The photogrammetry environment 400 may include a 3D model 402, constructed by a series of planar images 404 being captured by a capture device (e.g., a camera of the drone 102 of FIG. 1). Each of the planar images 404 may correspond, for example, to the planar images 206 of FIG. 2A. The 3D model 402 may correspond to the point cloud of the 3D scene 202 of FIG. 2A. FIG. 4 depicts corresponding feature points of each planar image 206, which may correspond to the tie points 208 of FIG. 2A.

Figure 5:
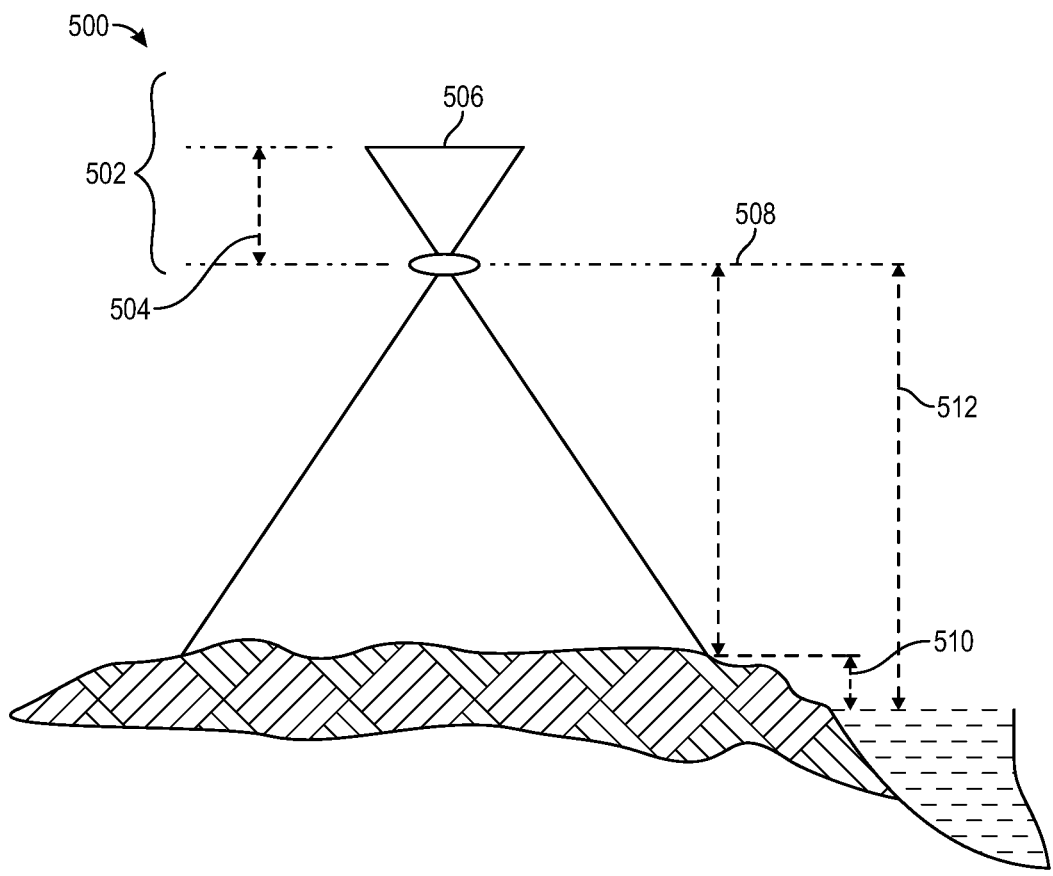
FIG. 5 depicts an exemplary photogrammetry environment, according to one embodiment.

FIG. 5 depicts an exemplary photogrammetry environment 500. The photogrammetry environment 500 includes a capture device 502. For example, the capture device may be onboard the drone 102 of FIG. 1. The capture device 502 may include a focal length and focal plane as determined by a lens 504. The lens 504 may be located a distance 508 above terrain (e.g., the ground, sea level, etc.). The distance above terrain 508 may be measured as a distance 512 measured relative to sea level 510. The scale of the image captured using the photogrammetry environment 500 may be calculated by computing the ratio of the focal length of the lens 504 of the camera 502 to the height above terrain 508.

Exemplary Generative Adversarial Network Region Filling—

Explicit Gaps

FIGS. 6A-6I depict exemplary images for training the generator and discriminator portions of a GAN (e.g., the GAN 300 of FIG. 3) to perform various region filling tasks for 3D point clouds that include explicit (i.e., added by programmed instructions), and for operating the trained GAN to generate region-filled 3D point clouds.

Figure 6A:
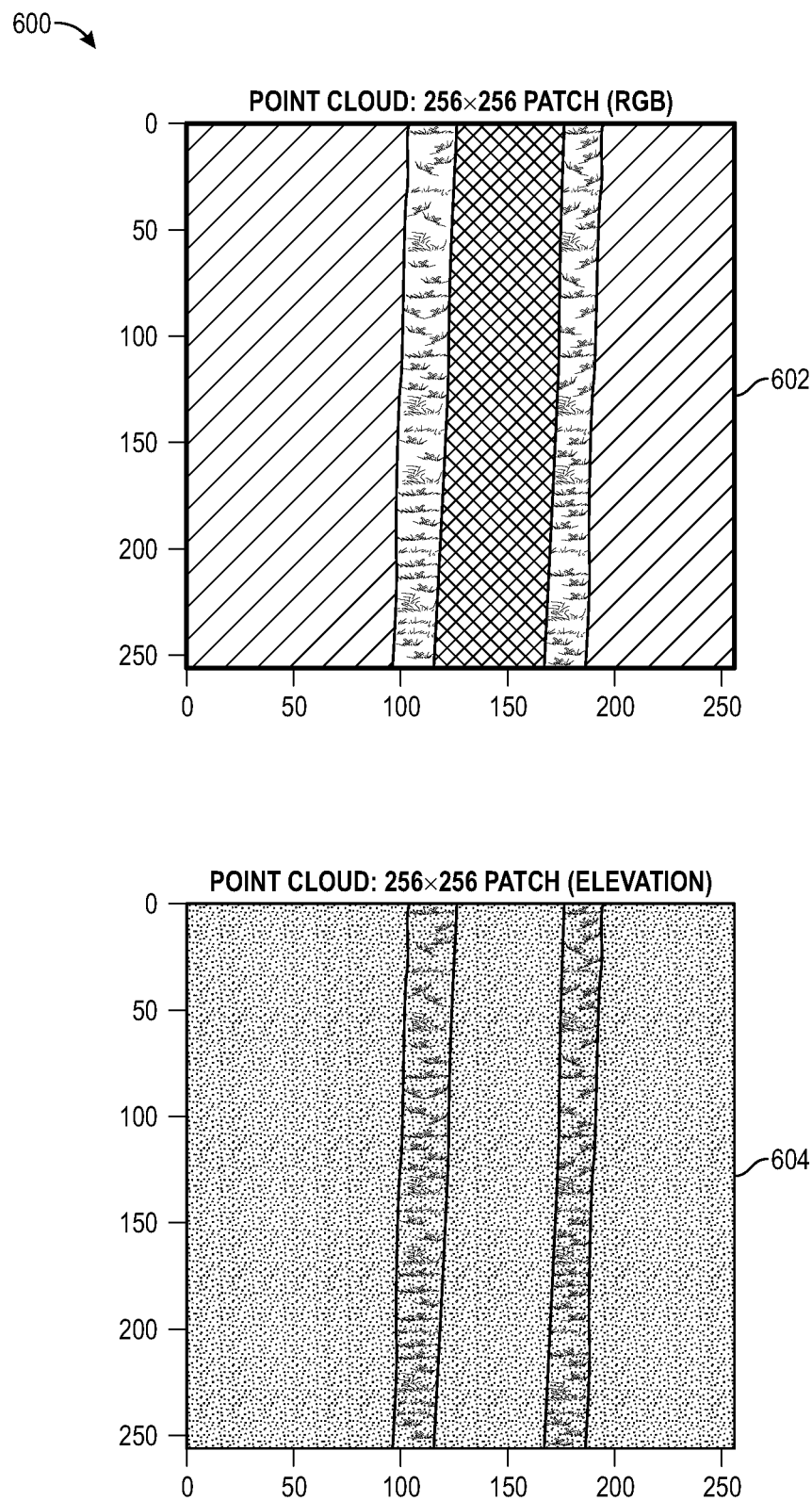
FIG. 6A depicts exemplary 3D ground truth image data corresponding to a road, according to one embodiment.

FIG. 6A depicts 3D ground truth image data 600 corresponding to a road. The ground truth image data 600 depicts RGB-colorspace ground truth image data 602 and elevation ground truth image data 604. The ground truth image data 600 may be used to train the GAN 300. For example, the RGB-colorspace ground truth image data 602 may correspond to the ground truth sample 310. In another embodiment, the elevation ground truth image data 604 may correspond to the ground truth sample image 310. The ground truth image data 600 may be stored in and/or retrieved from an electronic database, such as the database 108 of FIG. 1. A component of the environment 100 (e.g., the ML training module 168) may retrieve/receive the ground truth image data 600 during training.

Figure 6B:
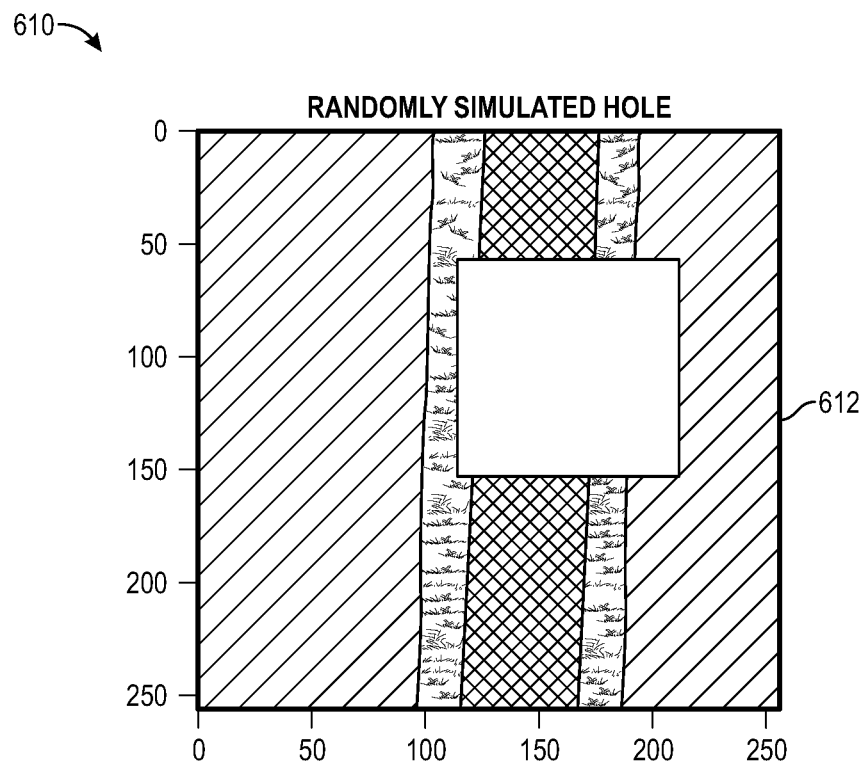
FIG. 6B depicts exemplary 3D generative image data, according to one embodiment.
Figure 6B:
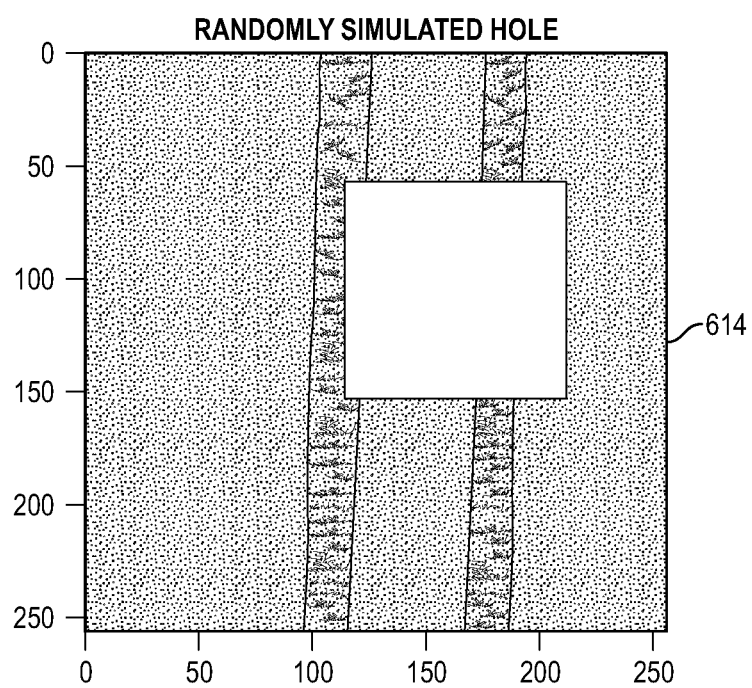

FIG. 6B depicts 3D generative image data 610. The generative image data 610 includes an RGB-colorspace generative sample image 612 and an elevation generative sample image 614. The RGB-colorspace generative sample image 612 and/or the elevation generative sample image 614 may correspond to the generative sample 306 of FIG. 3, in some embodiments. That is, the generative image data 610 may be produced by the ANN of the generator 304 and may be used as generative samples for training the discriminator 312 by, for example, the ML training module 168 of FIG. 1.

The RGB-colorspace generative sample image 612 and the elevation generative sample image 614 may include one or more respective holes, or gaps. The gaps may correspond to 3D cutouts added at random locations. Any 3D sub-images (e.g., cutouts) may be used (e.g., by the ML training module 168 of FIG. 1) to train the discriminator portion of the GAN. Specifically, the ML training module may remove one or more 3D portions from a 3D image at random, thereby causing one or more gaps corresponding to each of the one or more removed portions. The removed portions may be used to train the discriminator as ground truth data. In this way, advantageously, the GAN may be trained in an automated way, while removing any requirement of labeling data.

Figure 6C:
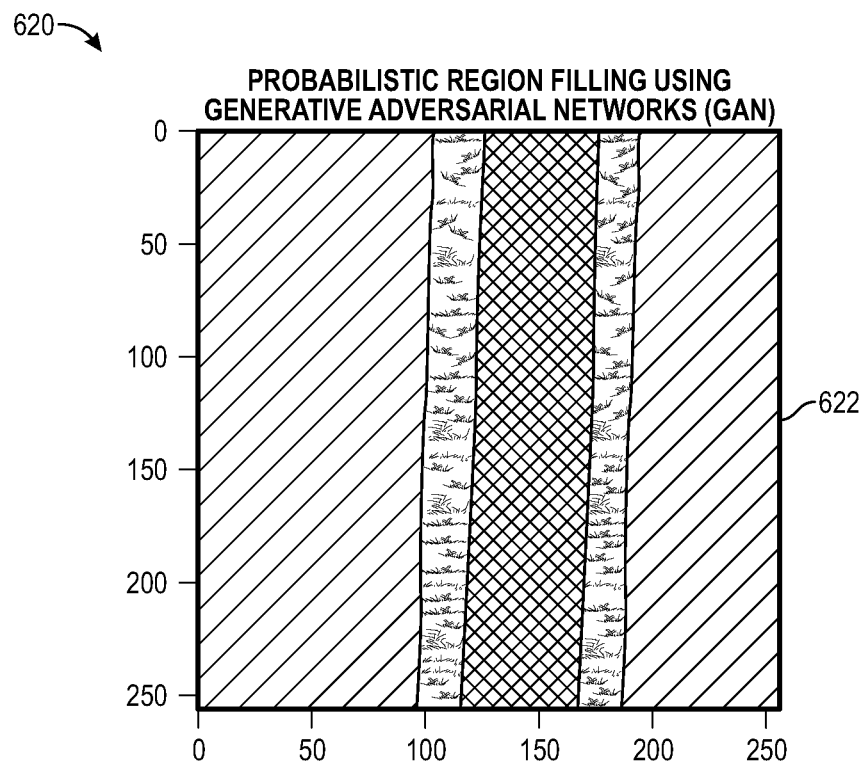
FIG. 6C depicts an exemplary 3D output of a generative adversarial network, according to one embodiment.
Figure 6C:
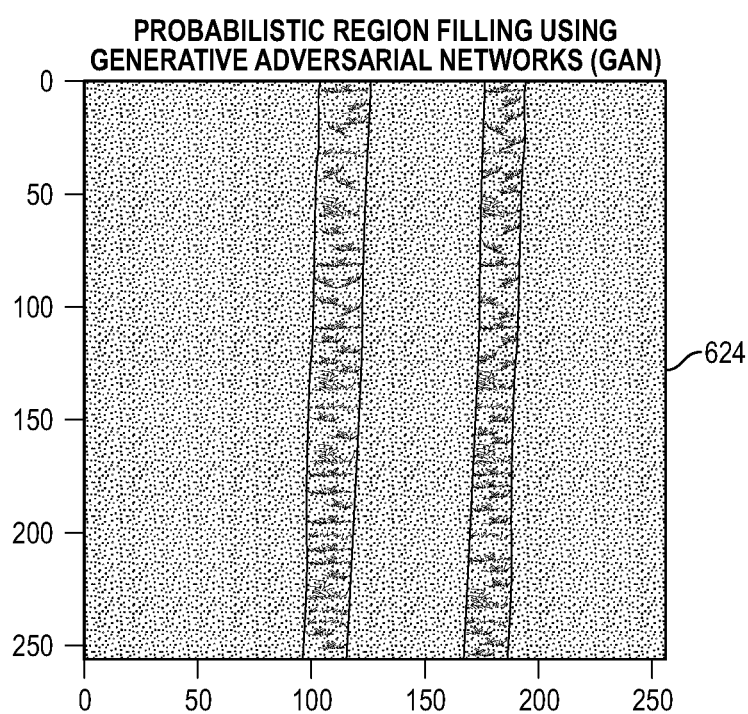

FIG. 6C depicts an exemplary 3D output 620 of a GAN trained using the ground truth image data 600 of FIG. 6A and/or the one or more removed 3D portions (e.g., the portions removed to create the gaps in the RGB-colorspace generative sample image 612 and/or the elevation generative sample image 614). Specifically, a GAN RGB output 622 represents the probabilistic, GAN-based region filling of the holes in the 3D generative RGB sample image 612 to match the surrounding region. A GAN elevation output 624 represents the probabilistic, GAN-based region filling of holes in the generative elevation sample 614. It should be appreciated that the output 620 of FIG. 6C appears similar to the ground truth image data 600 of FIG. 6A, but the portions of the output 620 that correspond to the holes of FIG. 6B are imputed by the GAN (i.e., they are fabricated to match the surroundings and do not represent pixels that were, in fact, included in an image of a real physical object).

Figure 6D:
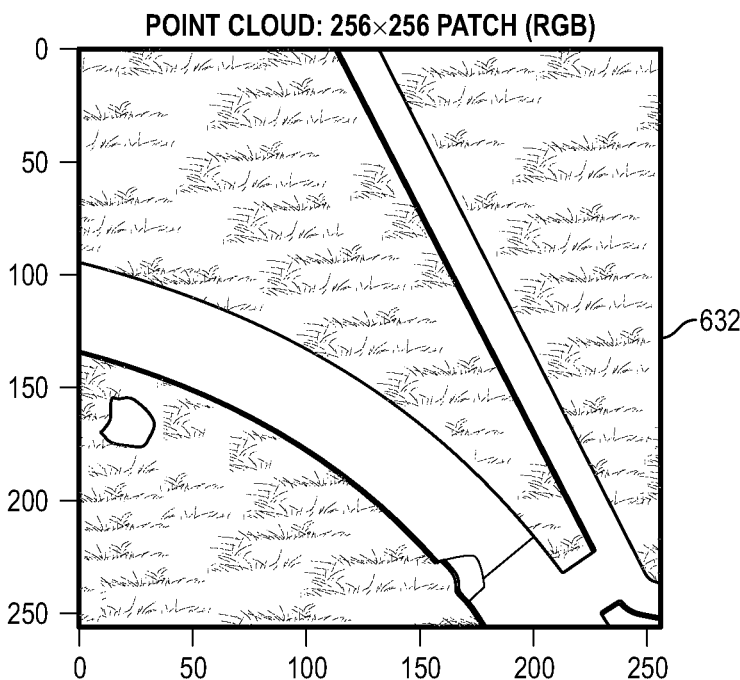
FIG. 6D depicts exemplary ground truth image data, according to one embodiment.
Figure 6D:
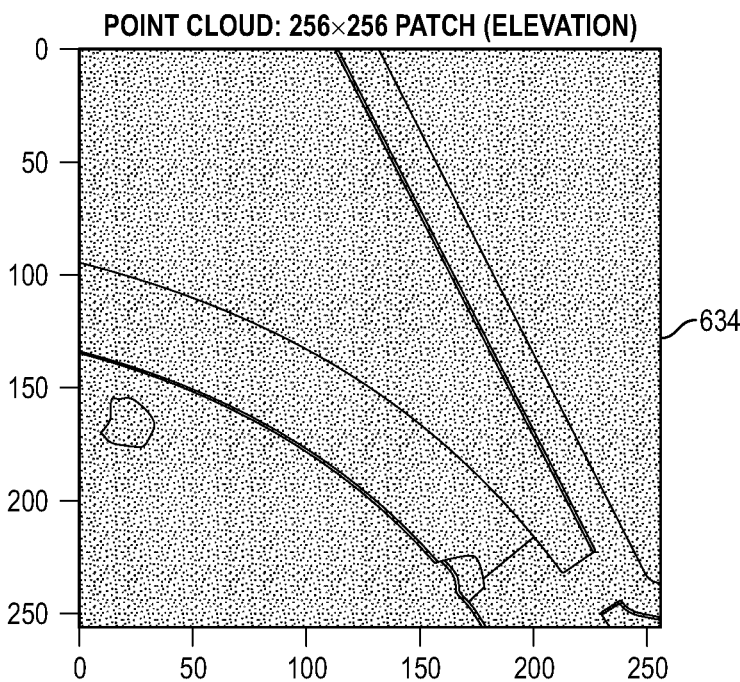

FIG. 6D depicts ground truth image data 630 corresponding to two sidewalks. The ground truth image data 630 depicts RGB-colorspace ground truth image data 632 and elevation ground truth image data 634. In some embodiments, the ground truth image data 630 may be used to train the GAN 300. For example, the RGB-colorspace ground truth image data 632 may correspond to the ground truth sample 310. In one embodiment, the elevation ground truth image data 634 may correspond to the ground truth sample image 310. The ground truth image data 630 may be stored in/retrieved from an electronic database, such as the database 108 of FIG. 1. A component of the environment 100 (e.g., the ML training module 168) may retrieve/receive the ground truth image data 630 during training.

Figure 6E:
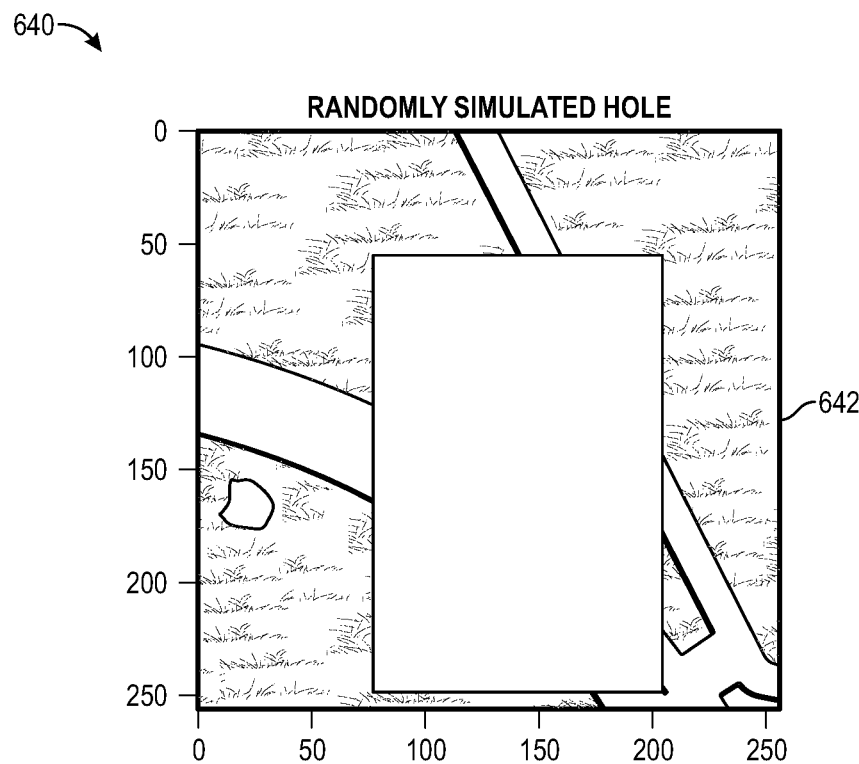
FIG. 6E depicts exemplary generative image data, according to one embodiment.
Figure 6E:
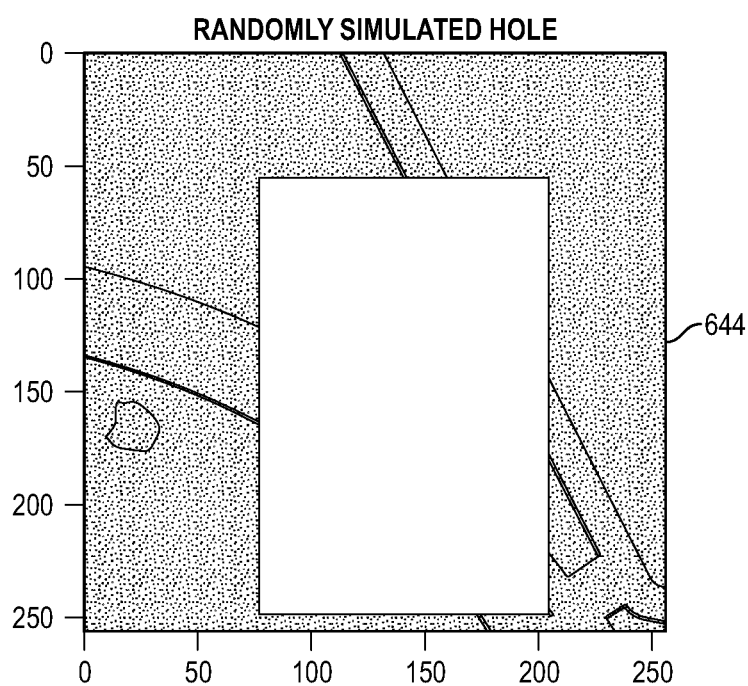

FIG. 6E depicts a generative image data 640. The generative image data 640 includes an RGB-colorspace generative sample image 642 and an elevation generative sample image 644. The RGB-colorspace generative sample image 642 and/or the elevation generative sample image 644 may correspond to the generative sample 306 of FIG. 3, in some embodiments. That is, the generative image data 640 may be produced by the ANN of the generator 304 and may be used as generative samples for training the GAN 300 by, for example, the ML training module 168 of FIG. 1. Specifically, the rectangles of the RGB-colorspace generative sample image 642 and the elevation generative sample image 644 representing random hole and/or gap locations may correspond to removed portions of the RGB-colorspace generative sample image 642 and the elevation generative sample image 644 removed. The present techniques may include training the GAN using the removed portions.

Figure 6F:
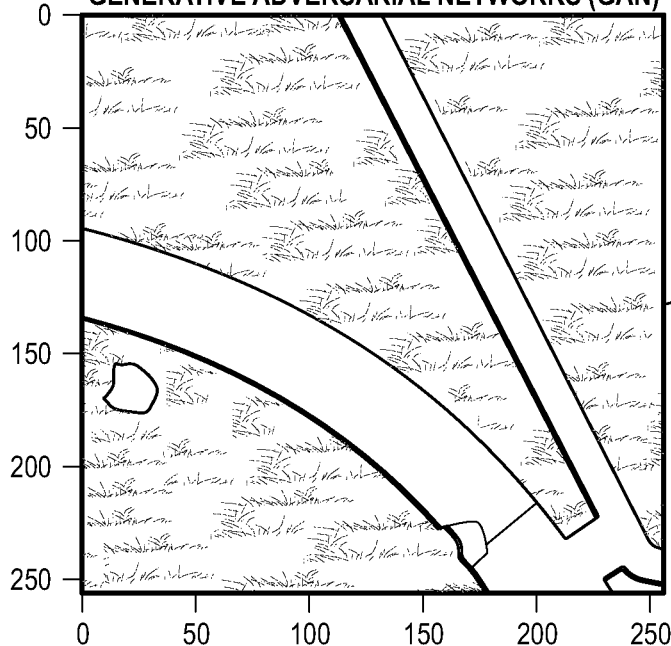
FIG. 6F depicts an exemplary output of a generative adversarial network, according to one embodiment.
Figure 6F:
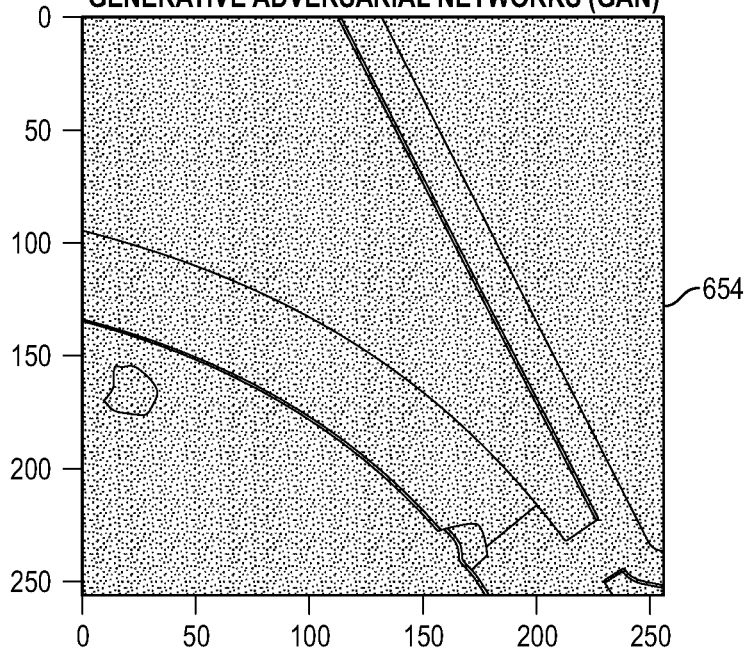

FIG. 6F depicts an exemplary output 650 of a GAN trained using the ground truth image data 630 of FIG. 6D and/or the generative image data 640 of 6E, and/or the removed portions. Specifically, a GAN RGB output 652 represents the probabilistic, GAN-based region filling of the one or more holes in the generative RGB sample image 642 to match the surrounding region. A GAN elevation output 654 represents the probabilistic, GAN-based region filling of holes in the generative elevation sample 644. It should be appreciated that the output 650 of FIG. 6F appears similar to the ground truth image data 630 of FIG. 6D, but the portions of the output 650 that correspond to the holes of FIG. 6E are imputed (i.e., they are fabricated to match the surroundings and do not represent pixels that were, in fact, included in an image of a real physical object). It should further be appreciated that in FIG. 6F, the GAN is seen to correctly and realistically fill both elevation and spatial/terrain regions wherein the holes in the generative image data 640 cover multiple divergent paths (e.g., two sidewalks).

Exemplary Generative Adversarial Network Region Filling—Implicit Gaps

As noted above, the present techniques are applicable to probabilistic filling randomly-generated (i.e., explicit) gaps/holes. The present techniques are also applicable, in some embodiments, to the probabilistic filling of gaps (i.e., blank regions) created during mapping due to the limitations of an imaging devices. For example, the present techniques may fill holes/gaps that appear in a 3D point cloud due to obstructions in the path of the imaging device used (e.g., a tree branch occluding the ground beneath). Specifically, the present techniques may be used to fill regions of images that include holes due to imaging artifacts (i.e., that include implicit gaps).

Figure 6G:
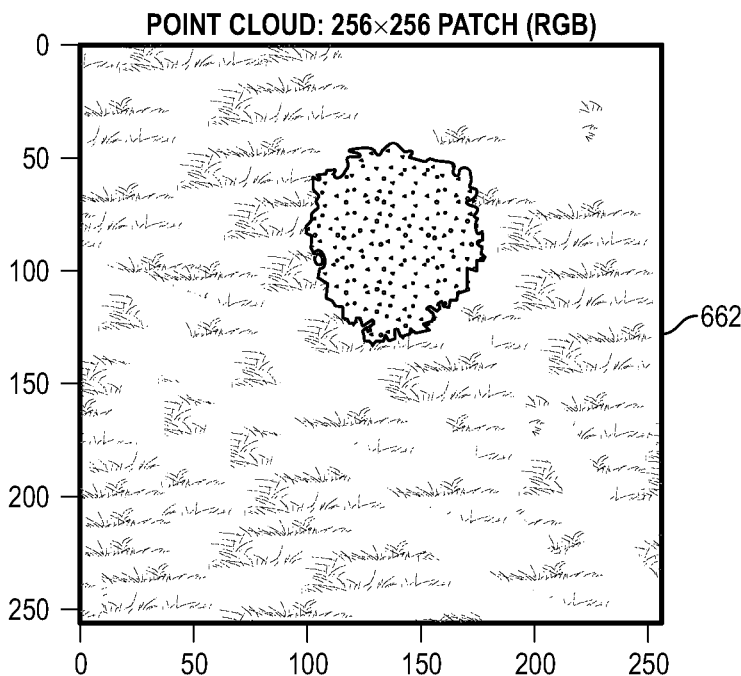
FIG. 6G depicts exemplary 3D ground truth image data, according to one embodiment.
Figure 6G:
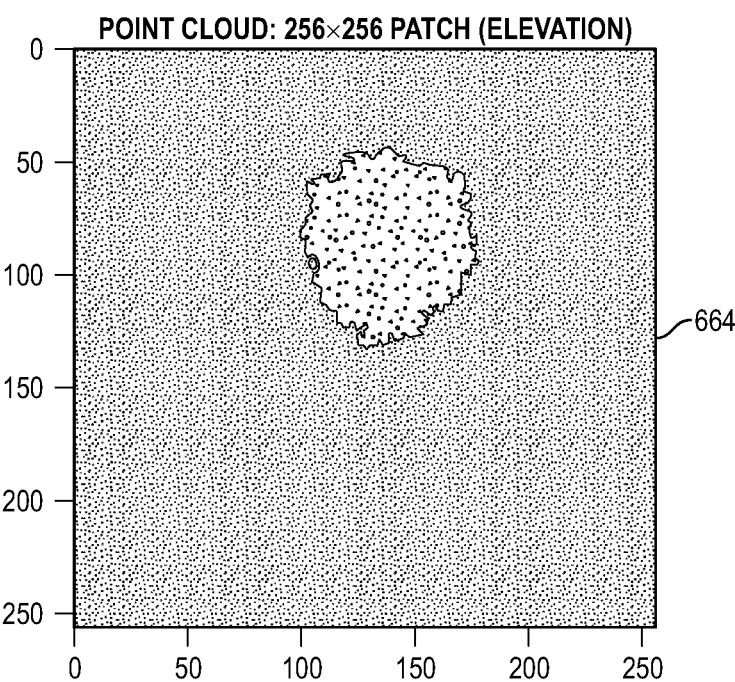

FIG. 6G depicts 3D ground truth image data 660 including a hole that may correspond to a tree. The hole, or gap, may have been included in the ground truth image data 660 as a result of an imaging artifact (i.e., an implicit gap). The ground truth image data 660 includes an RGB-colorspace ground truth image data 662 and elevation ground truth image data 664.

Figure 6H:
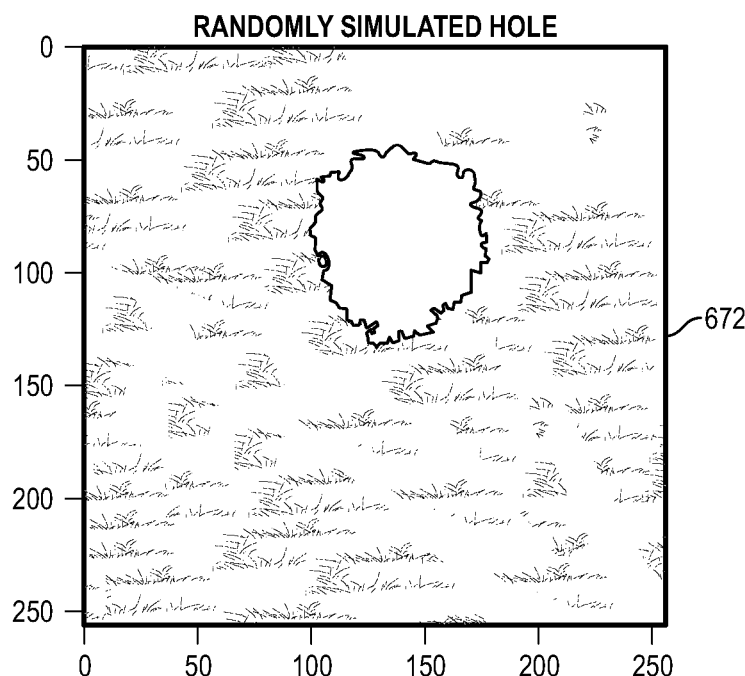
FIG. 6H depicts exemplary 3D generative image data, according to one embodiment.
Figure 6H:
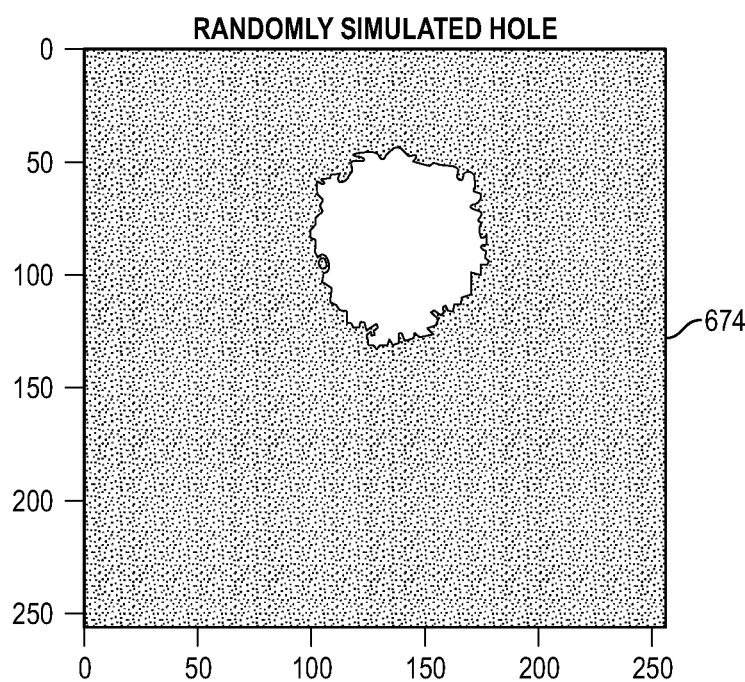

FIG. 6H depicts a 3D generative image data 670. The 3D generative image data 670 includes an RGB-colorspace generative sample image 672 and an elevation generative sample image 674. The RGB-colorspace generative sample image 672 and/or the elevation generative sample image 674 may correspond to the generative sample 306 of FIG. 3, in some embodiments. The gaps in the RGB-colorspace generative sample image 672 and the elevation generative sample image 674 may be randomly generated. The portions of the 3D generative image data 670 removed randomly (i.e., the portions corresponding to the gaps) may be used to train the GAN, as discussed above.

Figure 6I:
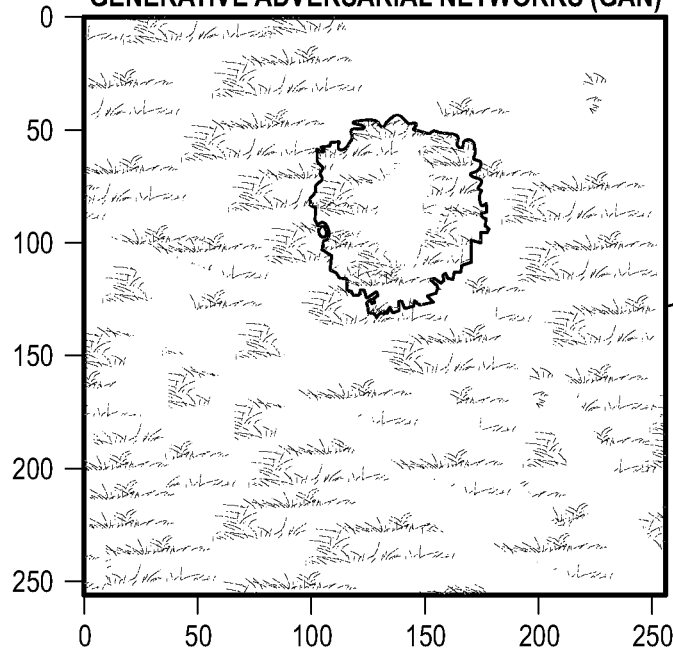
FIG. 6I depicts an exemplary 3D output of a generative adversarial network, according to an embodiment.
Figure 6I:
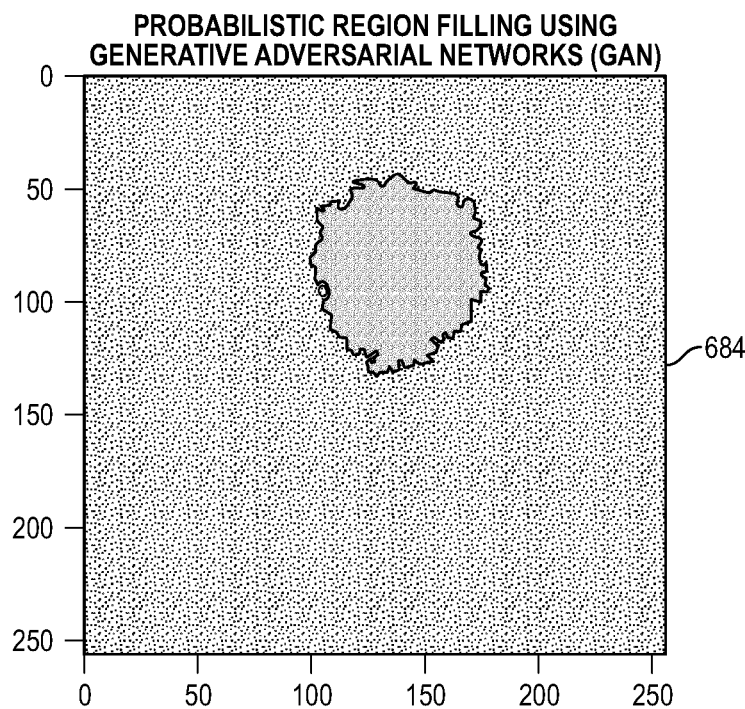

FIG. 6I depicts an exemplary 3D output 680 of a GAN trained using the ground truth image data 660 of FIG. 6G and/or the generative image data 670 of FIG. 6H, and/or the removed portions. Specifically, a GAN RGB output 682 may correspond to the RGB-colorspace ground truth image data 662, wherein the gaps have been filled in probabilistically by the GAN to match the surrounding area in color space, texture, etc. An elevation output 684 may correspond to the elevation ground truth image data 664.

Exemplary Floodplain Modeling

The present techniques are applicable to floodplain modeling using a 3D point cloud. Elevation is an important aspect for modeling a 3D point cloud due to the flow of water primarily determining flood damage. In the case of floodplain mapping, or projecting the flow of water, a 3D point cloud (e.g., the church scene of FIG. 2A) that may objects such as cars, trees, lampposts, benches, etc. If the flow of water is simulated in such a point cloud, water may appear to flow around objects in a manner that is unrealistic. Thus, removing such objects may advantageously provide a better, more accurate modeling outcome.

The location of buildings is similarly important. The present techniques may be used to fill gaps in a 3D point cloud, to improve the ability of modeling to improve quality of floodplain analysis. The present techniques may be used to fill gaps corresponding to the removal of superfluous 3D data (e.g., trees) not relevant to creating a high quality elevation map. Removing such 3D data may create gaps/holes, as described herein.

The insufficiency of interpolation techniques are particularly acute in the case of floodplain modeling. In a floodplain model, interpolating across a water channel, for example, may create an artificial barrier blocking flow of water where none exists in reality. Using the GAN-based approaches of the present techniques, on the other hand, fill in information accurately, allowing realistic water flow models to be developed. In yet further embodiments, the present techniques are applicable to additional use cases, such as video game design.

Exemplary Computer-Implemented Methods

Figure 7:
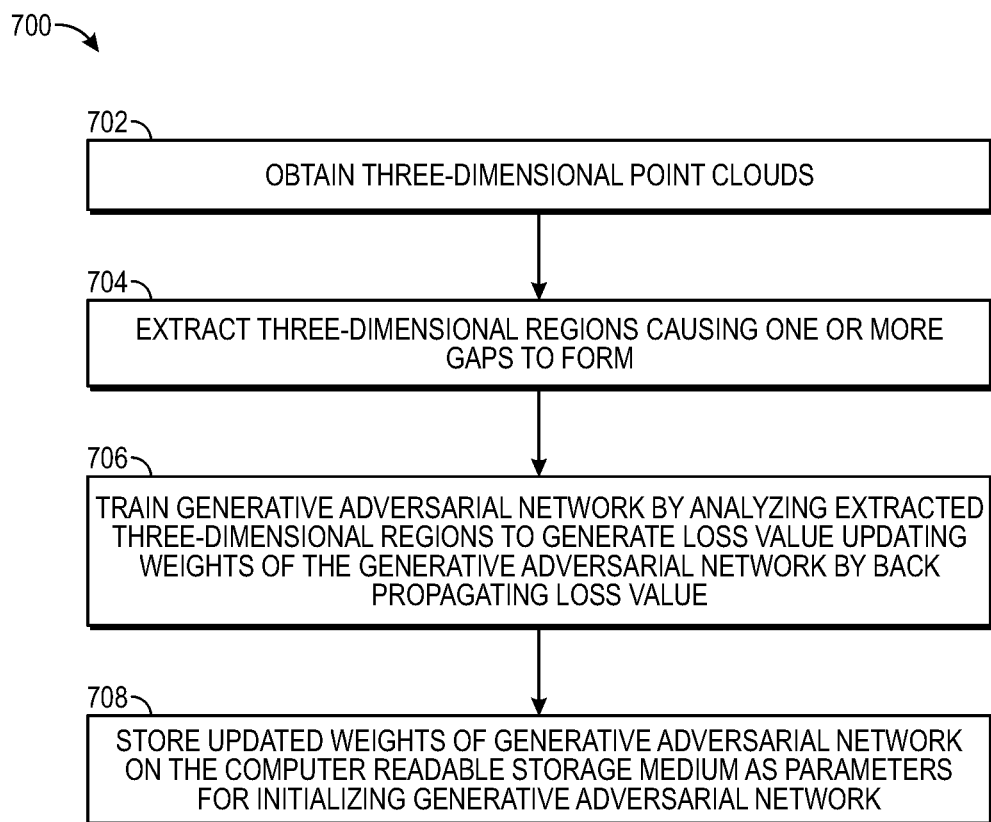
FIG. 7 depicts an exemplary computer-implemented method for training a generative adversarial network, according to one embodiment and scenario.

FIG. 7 depicts an exemplary computer-implemented method 700 for training a generative adversarial network, according to one embodiment and scenario.

The method 700 may include obtaining one or more training three-dimensional point clouds (block 702). The training 3D point clouds may be generated from 2D imagery via a photogrammetric process such as structure-from-motion. In some embodiments, the training point clouds may be captured by a drone such as the drone 102 of FIG. 1. In some embodiments, a single point cloud of a large area (e.g., a farm) may be subdivided into many smaller point clouds.

The method 700 may include extracting one or more three-dimensional regions from each training three-dimensional point cloud, wherein extracting the one or more three-dimensional regions from each training three-dimensional point cloud includes creating one or more gaps in each three-dimensional point cloud corresponding to each of the one or more extracted three-dimensional regions (block 704). For example, the ML training module 168 may analyze a point cloud and extract a region corresponding to each hole, or gap, in the point cloud. A single 3D point cloud may have many (e.g., 100 or more) gaps. The extracted regions including holes may be used as input to the GAN for training the GAN to classify a 3D image.

The method 700 may include training the generative adversarial network by analyzing the extracted three-dimensional regions and each three-dimensional point cloud including the respective one or more gaps, wherein the analyzing includes generating a loss value, and updating one or more weights of the generative adversarial network by backpropagating the loss value throughout the generative adversarial network (block 706). A generative loss may be backpropagated, and/or a discriminator loss.

The method 700 may include storing the updated weights of the generative adversarial network on the computer readable storage medium as parameters for initializing the generative adversarial network (block 708). For example, the ML training module 168 may store the updated weights once the GAN has converged (i.e., once a loss value of the GAN has met a predefined criteria).

In some embodiments, the method 700 may further include obtaining a three-dimensional point cloud having one or more gaps. The 3D point cloud having one or more gaps may correspond to a scene. The GAN may analyze the 3D point cloud and impute values into any gaps, such that the output of the method 700 is a point cloud having no gaps. In this way, method 700 may use the trained GAN to produce gapless point clouds. To use the trained GAN, for example, the ML operation module 170 of FIG. 1 may initialize the GAN using weights obtained during the training phase.

Imputation of the gaps may include imputing RGB data, elevation data, and/or other types of data (e.g., metadata). The method 700 may impute data in the gaps on a pixel-by-pixel level, in some embodiments. The method 700 may store the three-dimensional point cloud including the imputed data in a memory. In some embodiments, the method 700 may include displaying and/or transmitting the imputed 3D point cloud. The gaps may be natural or implicit gaps (e.g., gaps created as an artifact of imaging) and/or explicit gaps added by a manual process and/or an automated/programmatic process.

The method 700 may include updating the one or more weights of the generative adversarial network by backpropagating the loss value throughout the generative adversarial network, which may include backpropagating discriminator loss to a discriminator artificial neural network. Updating the one or more weights of the generative adversarial network by backpropagating the loss value throughout the generative adversarial network may include backpropagating discriminator loss to a discriminator artificial neural network and a generator artificial neural network. The discriminator and generator portions of the GAN may be trained together, separately, in serial, and/or in parallel. Those of skill in the art will appreciate that discriminator weights may not be changed during training of the generator artificial neural network, and/or that generator weights may not be changed during training of the discriminator artificial neural network. Further, the discriminator and generator may be trained for a limited number of epochs in an alternating pattern.

Exemplary Use Cases

In some embodiments, the present techniques may include the application of multiple/different deep learning techniques. For example, in one embodiment, a scene may be semantically segmented using a first ML model as discussed above, and a second ML model (e.g., a CNN) may be used to determine a roof geometry. A third ML model may be used to analyze the result of the semantic segmentation and the CNN output. The semantic segmentation information generated using the above-described techniques may be included in the 3D point cloud, and is useful for further analysis/ operations in many domains.

Vehicles & Transportation

For example, additional use cases that may be implemented using the above-described techniques include transportation-related implementations such as autonomous vehicle mapping wherein, for example, an autonomous vehicle generates mapping information and aerial imagery is collected. For example, the aerial imagery may correspond to a rural areas wherein airspace is less tightly restricted. In another example, LIDAR is used in an urban/metro area.

Some embodiments may improve existing autonomous vehicle navigation and/or orientation systems. For example, the present techniques may modify an existing localization technique to provide more precise navigation by combining data from multiple systems (e.g., GPS data, LIDAR data including known landmarks, a camera system that centers on lanes, drone data, etc.). The point cloud data from each may be combined and spatially segmented using the present techniques to produce high resolution maps for the autonomous vehicle. As the autonomous vehicle operates, a module in the autonomous vehicle may analyze the spatial data in the high resolution maps (e.g., a class of an object, such as a pothole) to determine a navigation decision (e.g., a turning angle) or to provide information to a vehicle operator.

In one embodiment, a plurality of point clouds from multiple sources (e.g., the autonomous vehicle and the LIDAR data) may be merged together into a highly-accurate point cloud (e.g., 3D data accurate to 2.5 cm geospatially), advantageously minimizing the spatial error known to affect current-generation GPS-based systems. The combined point cloud may be used to provide high definition 3D maps that include elevation information for different purposes. For example, the combined 3D point cloud may be used in an autonomous vehicle implementation to detect potholes, analyze elevation differences for curbs, etc.

In another embodiment, non-color data (e.g., LIDAR) is combined with colorspace information in a point cloud. A generative adversarial network (GAN) may be used to add color information to non-color point clouds.

The present techniques may be used to implement functionality specific to the operation heavy equipment (e.g., a bulldozer, a tractor-trailer truck/semi, etc.). For example, semantic segmentation may be used to segment a map. While the heavy equipment is used, the slope and/or elevation information may be used by an engine control module to adjust engine speed/RPM in response to an incline. In one embodiment, one or more drones may scout a future route/ future traffic to identify congestion. A route planning module may reroute the heavy equipment based upon the congestion. The drones may be used to determine future elevation. The engine control module may analyze the planning module to determine engine control decisions.

For example, when the engine control module identifies an aggressive slope ahead, the engine control module may increase engine torque to improve performance of the heavy equipment. When the route planning module identifies a steep decline, the engine control module may be caused to activate regenerative braking. The drones may be docked to the heavy equipment or dispatched via a waypoint along a route (e.g., at a roadside facility/installation) or a landmark (e.g., a rest area, a truck stop, etc.). The drones may facilitate the movement of multiple heavy equipment vehicles, such as assisting the entering/exiting of autonomous vehicles at a location. The drones may include self-service drones that are able to self-recharge.

In one embodiment, the present techniques facilitate risk assessment of an urban travel system. For example, the semantic segmentation information may be used to analyze the elevation and connection of roads/paths in a city. A significantly riskier road may be identified. A usage-based travel route may be identified wherein the risk associating with a particular road/path is used to plan travel. For example, a user may be notified (e.g., via a client computing device) that travel via a first road is longer, less expensive and/or less risky. The user may be notified that a second road is shorter, quicker, and/or more expensive. A route may be planned based upon a customer preference/ objective (e.g., based upon the customer's preference with respect to a quickest path, a path including scenery, an eScooter route, etc.). A route may be planned based upon anticipated wear/tear on a vehicle due to changes in elevation or another aspect.

The present techniques may be used in an agricultural setting, such as in analyzing grass ways necessary for watersheds within a field. The present techniques may be used during the installation of irrigation, and/or to reduce erosion. Multi-spectral imaging may be used to determine crop health, whether fertilizers/ chemicals are needed, etc. Elevation information may be used to determine whether to fill holes, to add earth, to plant an area, etc. The above-described drone technologies may be used to automate/ navigate tractors such as when plowing to pick up or lower a plow based upon the elevation of a field. A drone may launch from a tractor and photograph a future route. Structure-from-motion may be used to uncover potential problems in the path of the tractor. The present techniques may be used to place field tiles and for crop rotation and planting decisions. The present techniques may be used to prevent chemical/manure runoff.

Facilities Operation & Management

The present techniques may be used for facilities management. For example, the present techniques may be used in golf course modeling. A semantic segmentation 3D point cloud may allow golf course management to analyze precise terrain models. A virtual reality simulator may load a 3D point cloud to view a model/replica of the golf course for production purposes. The 3D point cloud including semantic segmentation information may be analyzed to detect erosion in a sand trap, green or fairway. For example, the 3D point cloud may be analyzed to determine how much sand is needed to replenish a sand trap, and/or to determine the acreage of a green, fairway, etc. The 3D point cloud including semantic segmentation information can be analyzed to determine irrigation and fertilizer usage, such as where irrigation heads are located in relation to one another.

The semantically segmented 3D point cloud may be used during play to determine the elevation/pitch/range of green in relation to where one is standing, and to determine play decisions/recommendations (e.g., club selection). The semantically segmented 3D point cloud enables an accurate base map with elevation to inform assistive play applications, such as when teaching golf or when simulation a course in electronic gaming A course may be duplicated or replicated based upon the semantic map, in some cases, using automated fabrication methods. The present techniques may be used to calculate par and to automate the delivery of products/services during play (e.g., a beverage, a snack, etc.). The semantically segmented 3D point clouds generated by the present techniques may be used in the provision of driverless or autonomous golf carts, and to prevent/reduce wear and tear on golf carts.

Aspects of play (e.g., the location of players and carts) may be added to the 3D point cloud. The 3D point cloud may be used to navigate the cart, for example by preventing driving on the green. In some embodiments, a system may use both the 3D point cloud and information from another source (e.g., a smart golf ball). A golf ball may be retrieved, e.g., from a hazard, via a drone. The semantically segmented 3D may be used to automatically identify course components (e.g., a fairway, green, rough vegetation, etc.). The present techniques may color-code the semantically segmented information within the point cloud to show course shape, curve, elevation, etc.

The present techniques may be used to implement functionality specific to other play, such as ski resorts, beaches, etc. For example, the semantically segmented 3D point cloud may be used to determine run difficulty, for hazard identification, to determine snow depth, and/or for maintenance (e.g., to identify runoff/erosion year over year). The 3D point cloud may be used to analyze locations for new ski lifts.

Modeling Peril

The present techniques may be used to model peril, such as a natural disaster. As discussed above, the present techniques enable high quality floodplain modeling. The present techniques may be used to implement wildfire risk management by, for example, detecting fuel loads in areas that correspond to higher likelihood of a wildfire affecting a structure and/or habitation. For example, the semantically segmented 3D model may be analyzed such that a fire break may be installed in a strategic location. A mapping module may automatically determine regions in the 3D point cloud where vegetation is located close to a road, a utility company property, an insured home, an insured business, etc.

The "tree" label may be used to identify areas having more trees of a predetermined type (e.g., having a higher burn rate, a higher foliage density, etc.). Predictive modeling may be used to determine fire risk based upon whether trees are labeled as having leaves or needles. It should be appreciated that the ML training and/or operation discussed above may be adjusted to account for any necessary spatial/semantic features, in addition to/alternate to the examples discussed. The present techniques may analyze the size and/or features of a structure to determine the risk level represented by the structure. The proximity of multiple structures and/or objects may be analyzed to determine risk.

The present techniques may be used to model risk in hurricane modeling, tornado modeling, and for modeling other convective storms. For example, the density of trees and other natural dampeners may be analyzed. Wind simulation may be performed using the semantic segmentation information contained in the 3D point cloud.

The present techniques may be used to implement earthquake modeling. For example, some soil types are more susceptible to the propagation of seismic waves. The resolution of existing soil maps is poor. In one embodiment, one or more drones collect hyperspectral imaging to determine and/or measure soil composition. The methods and systems may semantically segment the imaging to label soil as bedrock, clay, sand, etc. As elevation information is helpful in floodplain modeling, the soil properties may determine risk to a structure (e.g., sandy soil may undergo liquefaction in an earthquake). The height and/or number of stories of a building may be modeled using the present techniques, as may construction and/or material types (e.g., framed, masonry, etc.).

The present techniques may be used to model a potential path of lava flow for evacuation modeling. For example, the change in elevation may be analyzed to determine the cooling of lava. Topography of the 3D point cloud may be analyzed to determine lava flow, and whether a building is at risk. Mudslides, avalanches, rock slides and other disaster scenarios may be analyzed using similar techniques. Emergency response (e.g., police and fire) may be staged based upon semantically segmented information in the 3D point cloud, by identifying safe and unsafe areas.

Underwriting, Claim Handling & Retail

The present techniques may be used for underwriting, claim handling and retail purposes. In the context of underwriting, the above-described peril modeling may be used in underwriting risk assessment. A home insurance quote may be determined based upon analyzing a semantic segmentation 3D point cloud. For example, aspects of a dwelling may be counted and/or analyzed (e.g., a number of windows, a size of a garage, a number of stories, a roof composition, an estimated square footage, etc.). Additional characteristics may include a roof type, a chimney, a wall-mounted air-conditioning unit, etc. A drone may photograph storm damage to assess a damaged home, and to automatically handle a claim using detailed existing data and real-time data from a 3D point cloud. The present techniques may be implemented in the provision of crop insurance.

The present techniques may augment the 3D point cloud with historical customer data. When the model is missing information (e.g., has gaps) a GAN may combine 3D point cloud information with historical descriptions to fill the gaps. For example, when a structure is described in a textual description as having gray vinyl siding, the GAN may probabilistically fill the gaps using an imputed gray vinyl pattern.

The semantically segmented information may be used in fraud detection and for accident reconstruction. For example, a drone may capture imagery corresponding to a post-accident scene, and the scene may be semantically segmented. Certain information (e.g., broken glass, skid marks) may be used to detect the presence of an accident and/or as physical evidence (e.g., to determine speed).

The present techniques may facilitate access by retail customers. For example, an insurer may allow a user to purchase semantically segmented 3D point cloud data by encircling an area on a map. The insurer may provide the customer with the option to purchase one or more semantic 3D point cloud corresponding to the encircled area (e.g., a map of buildings, a map of vegetation, a map of the ground, etc.). The customer may submit one or more labels and a filtered 3D point cloud may be automatically generated and transmitted to the customer via a backend server. In some embodiments, the user may select different layers and/or models such as 3D models, orthomosaic models, etc. In one embodiment, the customer provides a 3D point cloud not including semantic segmentation information, and the insurer analyzes the customer's 3D point cloud using, e.g., the server 108 to generate a semantically segmented 3D point cloud. The semantically segmented point cloud may be delivered to the customer.

In some embodiments, an end user (e.g., a homeowner) flies a drone over the end user's property, and uploads images to the insurer, which provides the customer with a semantically segmented 3D point cloud, including an exterior inventory of home or other information. The insurer may provide a specific flight pattern for collecting optimal photos. With the end user's permission, the insurer may pass the segmented 3D point cloud to an underwriting and/or claims department. The claims/underwriting department may analyze the 3D point cloud in conjunction with existing data for different purposes (e.g., to detect structural changes). The present techniques may be used during the insurance application process. For example, a module operated by the insurer in the client device (e.g., an application executing in a consumer smart phone) may execute a drone flight path wherein the drone takes photographs of the applicant's home.

The present techniques may be used to generate physical 3D models that may include semantic segmentation information (e.g., surfaces of a different type may be printed using different colors of material using a 3D printer).

Smart phone applications may include the semantically segmented 3D point cloud information, and such information may be provided to developers via an API. Haptic feedback and/or voice feedback may be used to provide mapping capabilities. The height and/or slope of a workout may be analyzed, and custom workouts may be generated using the 3D point cloud information. In some embodiments, the semantically segmented 3D point clouds may be used to develop video games.

Construction and Urban Planning

The present techniques may be used in construction volumetrics. For example, in a major construction effort, the site must be cleared before building may begin, often at significant cost. Conventionally, estimates for cost are based upon crude measurements of land. The present techniques advantageously improve existing volumetrics measurement approaches by providing more precise ground elevation information. The elevation information may be used to calculate volumes of soil more accurately and to determine more refined cost estimates. The present techniques may be used in mining. The 3D map may be used to measure/analyze a building that is under construction.

The present techniques may be used during construction of an area (e.g., before building a residential subdivision). The segmented 3D point cloud may be used to survey land to determine locations for sewer management pumps, which may work more efficiently at particular relative elevations. The present techniques may be used to avoid building on saturated ground, for example, when installing concrete or asphalt. The present techniques may be used in utility management (e.g., for sewer, gas, power, and water). The present techniques may be used to model the location of street signs.

As noted above, the present techniques may be used to generate semantically segmented 3D point clouds that are very accurate. Such point clouds may be used to determine the attributes of buildings (e.g., blueprints, elevation of windows, how far windows are away from each other, the shadow of buildings, landscaping, architectural features, etc.). Such point clouds have many uses, including for historic preservation/modeling/reconstruction of historic or otherwise significant sites. Such 3D models may be combined with a customer's written description to rebuild a damaged home, filling in any gaps in the 3D point cloud with the customer's recollections.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for using a trained generative adversarial network to improve construction volumetrics, comprising:
   obtaining a semantically segmented point cloud associated with a terrain of a site;
   generating a terrain point cloud for the site using the trained generative adversarial network to fill one or more gaps within the semantically segmented point cloud; and
   determining a volumetric soil measurement of a portion of the site using the terrain point cloud.

2. The computer-implemented method of claim 1, further comprising:
   automatically removing one or more objects from the semantically segmented point cloud to generate the one or more gaps.

3. The computer-implemented method of claim 2, wherein the one or more objects include a portion of at least one of the following: a tree, a structure, a vehicle, or a person.

4. The computer-implemented method of claim 1, wherein obtaining the semantically segmented point cloud comprises generating the semantically segmented point cloud from at least one of the following data sources: GPS data, LIDAR data, image data, or aerial data.

5. The computer-implemented method of claim 4, wherein generating the semantically segmented point cloud comprises identifying the one or more gaps.

6. The computer-implemented method of claim 1, wherein:
   the terrain point cloud includes elevation data associated with the terrain of the site, and
   the volumetric soil measurement is based upon the elevation data.

7. The computer-implemented method of claim 6, further comprising:
   identifying saturated ground at the site based upon the elevation data.

8. The computer-implemented method of claim 6, further comprising:
   analyzing the terrain point cloud to determine one or more locations for site infrastructure elements based upon the elevation data.

9. The computer-implemented method of claim 1, further comprising:
   training the trained generative adversarial network to probabilistically fill artificial gaps in training point clouds by extracting irregular portions of the training point clouds to generate the artificial gaps.

10. A computing system for using a trained generative adversarial network to improve construction volumetrics, comprising:
    one or more processors, and
    one or more memories having stored thereon computer-executable instructions that, when executed, cause the computing system to:
      obtain a semantically segmented point cloud associated with a terrain of a site;
      generate a terrain point cloud for the site using the trained generative adversarial network to fill one or more gaps within the semantically segmented point cloud; and
      determine a volumetric soil measurement of a portion of the site using the terrain point cloud.

11. The computing system of claim 10, wherein the computer-executable instructions further cause the computing system to automatically remove one or more objects from the semantically segmented point cloud to generate the one or more gaps.

12. The computing system of claim 11, wherein the one or more objects include a portion of at least one of the following: a tree, a structure, a vehicle, or a person.

13. The computing system of claim 10, wherein:
    the terrain point cloud includes elevation data associated with the terrain of the site, and
    the volumetric soil measurement is based upon the elevation data.

14. The computing system of claim 13, wherein the computer-executable instructions further cause the computing system to analyze the terrain point cloud to determine one or more locations for site infrastructure elements based upon the elevation data.

15. A non-transitory computer-readable medium having stored thereon computer-executable instructions for using a trained generative adversarial network to improve construction volumetrics that, when executed by one or more processors of a computing system, cause the computing system to:
- obtain a semantically segmented point cloud associated with a terrain of a site;
- generate a terrain point cloud for the site using the trained generative adversarial network to fill one or more gaps within the semantically segmented point cloud; and
- determine a volumetric soil measurement of a portion of the site using the terrain point cloud.

16. The non-transitory computer-readable medium of claim 15, wherein the computer-executable instructions further cause the computing system to automatically remove one or more objects from the semantically segmented point cloud to generate the one or more gaps.

17. The non-transitory computer-readable medium of claim 16, wherein the one or more objects include a portion of at least one of the following: a tree, a structure, a vehicle, or a person.

18. The non-transitory computer-readable medium of claim 15, wherein the computer-executable instructions that cause the computing system to obtain the semantically segmented point cloud cause the computing system to generate the semantically segmented point cloud from at least one of the following data sources: GPS data, LIDAR data, image data, or aerial data, wherein generating the semantically segmented point cloud comprises identifying the one or more gaps.

19. The non-transitory computer-readable medium of claim 15, wherein:
- the terrain point cloud includes elevation data associated with the terrain of the site, and
- the volumetric soil measurement is based upon the elevation data.

20. The non-transitory computer-readable medium of claim 19, wherein the computer-executable instructions further cause the computing system to analyze the terrain point cloud to determine one or more locations for site infrastructure elements based upon the elevation data.

* * * * *